(12) United States Patent
Mathews et al.

(10) Patent No.: US 10,896,420 B2
(45) Date of Patent: Jan. 19, 2021

(54) PRODUCT ANALYSIS PLATFORM TO PERFORM A FACIAL RECOGNITION ANALYSIS TO PROVIDE INFORMATION ASSOCIATED WITH A PRODUCT TO A USER

(71) Applicant: Capital One Services, LLC, McLean, VA (US)

(72) Inventors: Liju Mathews, Plano, TX (US); Satish Chikkaveerappa, McKinney, TX (US); Ponnazhakan Subramanian, McKinney, TX (US); Amit Deshpande, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/203,066

(22) Filed: Nov. 28, 2018

(65) Prior Publication Data

US 2020/0167794 A1 May 28, 2020

(51) Int. Cl.
*G06Q 20/40* (2012.01)
*G06F 16/9035* (2019.01)
*G06K 9/00* (2006.01)

(52) U.S. Cl.
CPC ... *G06Q 20/40145* (2013.01); *G06F 16/9035* (2019.01); *G06K 9/00288* (2013.01)

(58) Field of Classification Search
CPC .............. G06Q 30/0269; G06Q 20/40145
USPC ........................................... 705/44
See application file for complete search history.

(56) References Cited

U.S. PATENT DOCUMENTS

| | | | |
|---|---|---|---|
| 7,809,601 B2 | 10/2010 | Shaya et al. | |
| 9,000,927 B2 | 4/2015 | Xiong et al. | |
| 2003/0014307 A1 | 1/2003 | Heng | |
| 2008/0004951 A1 | 1/2008 | Huang et al. | |
| 2013/0046637 A1* | 2/2013 | Slutsky | H04N 9/47 705/14.66 |
| 2017/0186043 A1 | 6/2017 | Pan | |
| 2017/0323299 A1* | 11/2017 | Davis | G06Q 20/204 |

* cited by examiner

*Primary Examiner* — Clifford B Madamba
(74) *Attorney, Agent, or Firm* — Harrity & Harrity, LLP

(57) ABSTRACT

A device may determine that a user has a threshold level of interest in a type of product. The device may receive an image of a face of the user, may perform a facial recognition analysis of the image, and may determine identification information of the user based on the facial recognition analysis. The device may identify account information associated with the user based on the identification information and may identify a product in an inventory that is associated with the type of product. The device may perform a preauthorization process associated with a transaction involving the product and the user based on the account information, and may perform an action associated with the transaction based on the preauthorization process.

20 Claims, 9 Drawing Sheets

PRODUCT ANALYSIS PLATFORM TO PERFORM A FACIAL RECOGNITION ANALYSIS TO PROVIDE INFORMATION ASSOCIATED WITH A PRODUCT TO A USER

BACKGROUND

A customer may engage in a transaction with an entity for a service and/or a good. The entity may be an individual and/or organization that provides the service and/or the good. In some cases, the customer may register and/or have an account with the entity (e.g., a financial account, a member account, and/or the like) that enables the customer and/or entity to access information associated with the transaction, the service, and/or the good. The account may further include information associated with the customer, such as a name, an address, and/or the like.

SUMMARY

According to some implementations, a method may include determining that a user has a threshold level of interest in a type of product. The method may include receiving an image of a face of the user, performing a facial recognition analysis of the image, and determining identification information of the user based solely on the facial recognition analysis. The method may include identifying account information associated with the user based on the identification information and identifying a product in an inventory that is associated with the type of product. The method may include performing a preauthorization process associated with a transaction involving the product and the user based on the account information, and performing an action associated with the transaction based on the preauthorization process.

According to some implementations, a device may include one or more memories, and one or more processors, communicatively coupled to the one or more memories, to obtain an indication that a user may engage in a transaction involving a type of product. The one or more processors may obtain an image of a face of the user, perform a facial recognition analysis of the image, and determine an identity of the user based on the facial recognition analysis. The one or more processors may identify a profile associated with the identity using the determined identity, and may obtain, from a data structure, one or more characteristics of the user based on the profile. The one or more processors may, based on the one or more characteristics of the user, select a product from a product inventory to suggest to the user, wherein the selected product is associated with the type of product. The one or more processors may provide information associated with the selected product to a device associated with the user to permit the user to engage in a transaction involving the selected product.

According to some implementations, a non-transitory computer-readable medium may store instructions that include one or more instructions that, when executed by one or more processors of a device, cause the one or more processors to receive an image of a face of a user. The one or more instructions may cause the one or more processors to perform a facial recognition analysis of the face of the user, and to determine an identity of the user based on the facial recognition analysis. The one or more instructions may cause the one or more processors to obtain, from a plurality of different data structures, data associated with the user based on the identity of the user without the user providing any other information associated with the user, and to process the data to identify information associated with the user engaging in a transaction involving a product. The one or more instructions may cause the one or more processors to determine a characteristic of the product, to perform a preauthorization process associated with the transaction using the information associated with the user and the characteristic of the product, and to perform an action based on a result of the preauthorization process.

DETAILED DESCRIPTION

Figure 1A:
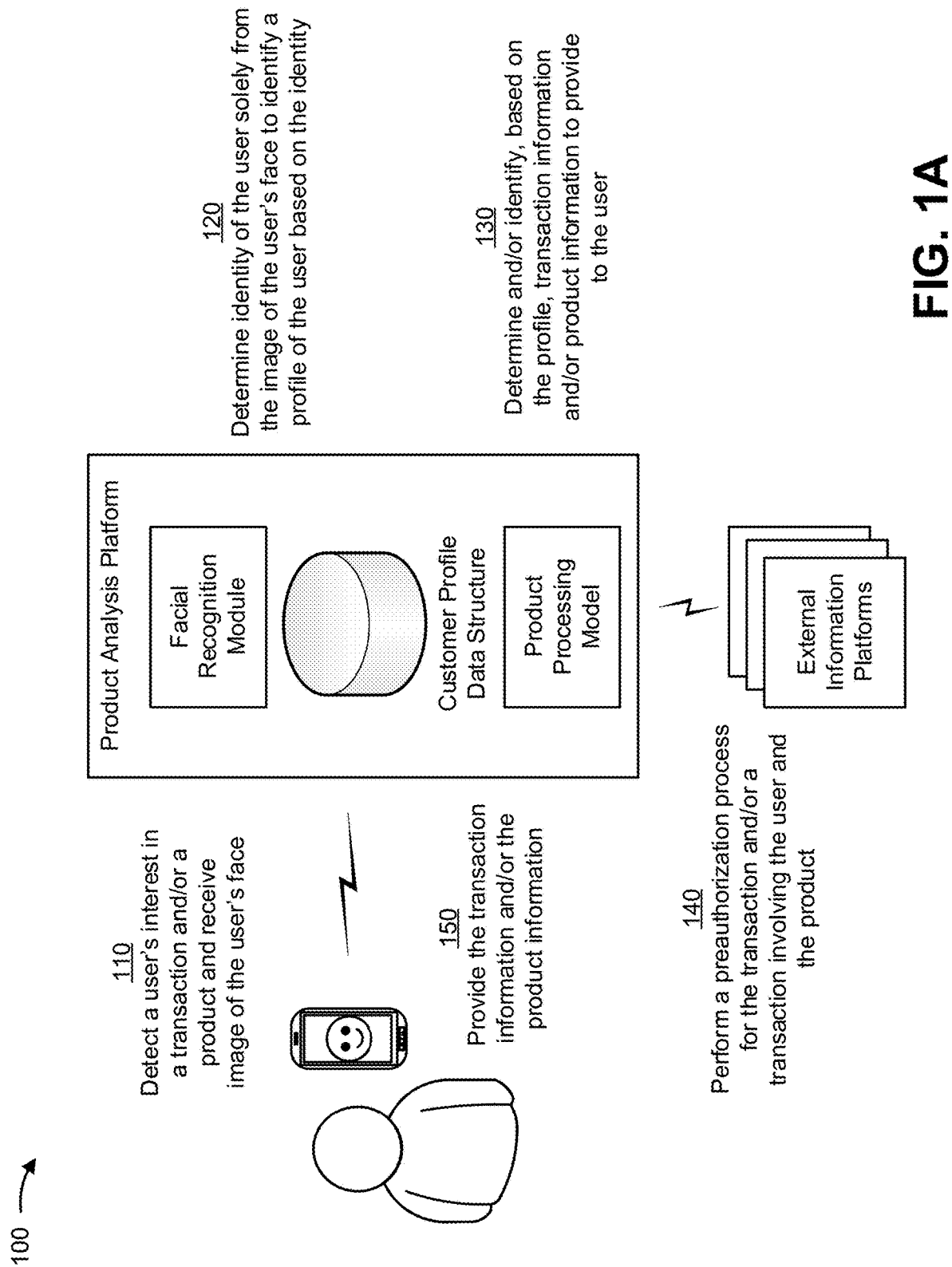
FIGS. 1A-1D are diagrams of an example implementation described herein.

The following detailed description of example implementations refers to the accompanying drawings. The same reference numbers in different drawings may identify the same or similar elements.

In some instances, a consumer may spend hours, days, weeks, or more considering whether to engage in a transaction to purchase a product from an entity (e.g., an individual, a partnership, an organization a business, a company, and/or the like). Once the consumer makes a decision, depending on the product, the consumer may go through a rigorous application process with the entity to enter into the transaction and ultimately purchase the product. Such a rigorous application process, especially after a long search for the product, may dissuade the consumer from going through that process again and/or from making any future purchases from the same entity. Furthermore, in many instances, when a less patient consumer has an interest in a product (or a type of product), unless the consumer can gain information about (including details of purchasing that product) and/or gain access to (e.g., through a fast application process, a fast sales process, and/or the like) that product quickly, there is a relatively high likelihood that the consumer will not purchase the product until a later date, if at all. In that case, if the consumer may have considered engaging in a transaction for that product with a particular entity, but the product was not available and/or the process of purchasing the product through the entity seemed overwhelming to the consumer, that entity may not have the opportunity to gain that consumer as a customer and/or may lose that sale for the product.

Some implementations described herein enable a consumer (referred to herein as a "user") to relatively quickly and seamlessly receive a recommendation for a product, obtain information associated with a transaction involving the product, and/or obtain a preauthorization for a transaction involving the product to permit the user to potentially engage in the transaction to acquire the product. As described herein, a service provider may obtain information associated with the user and/or gain access to one or more data structures that include information associated with the user to build a profile for the user. In such cases, the user may opt-in to a service in connection with one or more processes described herein to permit the service provider to build the profile of the user as described herein and/or to receive a service in connection with one or more processes described herein. Additionally, or alternatively, the user may opt-out of a service in connection with one or more processes described herein to prevent the service provider from building the profile of the user as described herein and/or providing a service in connection with the one or more processes described herein.

In some implementations, the service provider may receive identification information (e.g., a name, an address, a phone number, an account number, an identification number, a physical trait, a member identification number, and/or the like) from the user when the user becomes a customer of the entity, may receive account information (e.g., types of accounts with the service provider, statuses of the accounts, and/or the like) when the user opens an account with the entity and/or engages in transaction with the entity, and/or the like. Accordingly, over time, the entity may build a profile and/or model associated with the user that provides insight into interests of the user (e.g., potential transactions, potential products, and/or the like). Some implementations may use the profile and/or the model (e.g., a machine learning model) to predict a level of interest that the user may have in a product, a likelihood that the user would engage in a transaction for the product, a likelihood that the user is eligible to engage in the transaction for the product, and/or the like.

In some implementations described herein, to enable the user to relatively quickly receive a recommendation for a product and/or a transaction associated with a product, receive information about a product, and/or engage in a transaction for a product, the user may only need to provide an image of the user's face to a product analysis platform. As described herein, the product analysis platform may perform a facial recognition analysis of the image, identify identification information based on the facial recognition analysis, identify a profile (which may include account information, purchase history, rental history, and/or the like) associated with the user based on the identification information, and/or identify one or more products and/or transactions to recommend to the user. In some implementations, the identification information may be identified based solely on the facial recognition analysis. In some implementations, the product analysis platform may perform an analysis to preauthorize the user for one or more transactions associated with the product, including identifying one or more parameters for the transaction. In some implementations, the product analysis platform may recommend particular products (e.g., a particular vehicle, a particular house, and/or the like) based on one or more characteristics of the user (e.g., physical traits, family traits, known preferences, and/or the like) that are obtained and/or learned (e.g., via machine learning) from the user profile.

In this way, several different stages of a process for identifying a product and/or a transaction to recommend to a user, for receiving information from the user to engage in a transaction for a product, and/or for engaging in a transaction with a user are automated, thereby removing human subjectivity and waste from the process, and improving speed and efficiency of the process and conserving computing resources (e.g., processor resources, memory resources, and/or the like). Furthermore, some implementations described herein use a rigorous, computerized process to perform tasks or activities that were not previously performed. For example, previously, there did not exist a technique to determine a level of interest that a user has in a product (or type of product), receive an image of a user and identify a profile (e.g., a profile that includes certain information associated with the user as described herein) of the user based solely on the image of the user, identify one or more products in an inventory (or a list of products) for the user, perform a preauthorization process associated with a transaction for the product, determine one or more parameters for the transaction, and/or the like to permit the user to engage in a transaction for a particular product. Accordingly, computing resources associated with providing information for a rigorous application process, and/or the like, according to previous techniques, are conserved, as described herein. Finally, automating one or more processes for identifying a product and/or a transaction to recommend to a user, for receiving information from the user to engage in a transaction for a product, and/or for engaging in a transaction with a user, as described herein, conserves computing resources (e.g., processor resources, memory resources, and/or the like) and/or network resources that would otherwise be wasted by a user searching for a product, by a user providing identification information and/or submitting an application to engage in a transaction for a product, by a user investigating whether the user may be qualified to engage in the transaction for the product, and/or the like.

As used herein, a "merchant" may refer to an entity involved in the sale or leasing of goods or services. For example, a merchant may be a trader, a retailer, a vendor, a seller, a lessor, and/or the like.

FIGS. 1A-1D are diagrams of an example implementation 100 described herein. As shown, example implementation 100 includes a user device, a product analysis platform, and one or more external information platforms. As further shown, the product analysis platform may include a facial recognition module, a customer profile data structure, and a product processing model. In some implementations, the product analysis platform may be associated with an entity. The entity may be a merchant, a financial institution (e.g., a bank, a credit union, and/or the like), and/or the like.

As described herein, the product analysis platform may use one or more artificial intelligence techniques (e.g., machine learning, deep learning, artificial neural network, and/or the like) to identify that a user is interested in a transaction, a product, and/or a service, provide information associated with a transaction, a product, and/or a service, perform a preauthorization process associated with a transaction (e.g., a transaction involving a product and/or a service), provide information associated with a transaction involving a product and/or the service, enable the user to engage in a transaction to acquire a product and/or receive a service, and/or the like. Although some implementations described herein involve a product and/or acquiring a product, such implementations may similarly be applied involving a service and/or receiving a service.

As shown in FIG. 1A, and by reference number 110, the product analysis platform detects a user's interest (or potential interest) in a transaction and/or a product and receives an image of a face of the user. In some implementations, the product may be associated with the transaction. As described herein, the transaction may correspond to a loan (e.g., a mortgage, an auto loan, and/or the like), a refinance of a loan for a product that was previously purchased, a sale of the product, a lease of the product, and/or the like. The product may be any type of product (e.g., a vehicle, a house, electronics equipment, a piece of furniture, and/or the like). Accordingly, in some implementations, the transaction may correspond to a purchase of the product or a refinance of a loan involving the product. Although the present disclosure may refer to a product and/or one or more transactions involving a product, some implementations described herein may similarly be applied to one or more services. Therefore, a transaction may also involve an agreement to provide and/or receive a service, a contract associated with providing and/or receiving a service, and/or the like.

In some implementations, the product analysis platform may determine that the user has interest in the transaction and/or the product based on receiving a message from the user device of the user. For example, the message may include a request for information associated with the transaction and/or a request for information associated with the product. In some implementations, the message may have been generated and/or provided via an application associated with the user device. For example, the application may permit the user to browse transactions and/or products and request or prompt the user to provide an image of the user's face (e.g., via a camera of the user device). In some implementations, the application may prompt the user to provide an image of the user's ace when the user indicates interest in the transaction and/or the product (e.g., by clicking an item). In some implementations, the user device may be a kiosk device of a branch location associated with the entity. Accordingly, the fact that a user is accessing a kiosk device may, in and of itself, imply that the user is interested in the transaction and/or interested in the product (e.g., because the purpose of the kiosk may be identified in the branch as a device to identify the user, provide information on the transaction and/or product, recommend the transaction and/or product to the user, facilitate the transaction for the product, and/or the like).

In some implementations, the product analysis platform may determine that the user has interest in the transaction and/or product based on a characteristic of the user device that provided the image of the user's face. For example, the product analysis platform may determine that the user has a level of interest in a product based on a location of the user device. For example, if the user device is at a particular merchant location, the product analysis platform may determine that the user that provided the image of the user's face has an interest in a product and/or transaction associated with that location. More specifically, if the product analysis platform determines that the location of the user device corresponds to the location of a vehicle dealership, for example, the product analysis platform may determine that the user is likely interested in purchasing, leasing, and/or applying for a loan for a vehicle. Additionally, or alternatively, the product analysis platform may determine that a user has interest in a particular transaction and/or product based on the type of device that sends the image of the user's face to the product analysis platform. For example, if the device is a kiosk device associated with a merchant, the product analysis platform may identify one or more transactions and/or one or more products associated with the kiosk device and/or the merchant and determine that the user likely has an interest in engaging in such a transaction and/or has an interest in acquiring such a product.

According to some implementations, the product analysis platform may determine a level of interest that the user has in the transaction and/or the product, and proactively request the user for the image of the user's face via the user device. For example, the user may be considered a customer of the entity associated with the product analysis platform. As used herein, the user may be considered a "customer" of the entity if the user previously engaged in a transaction with the entity or a "potential customer" of the entity if the user previously provided identification information to the entity (e.g., to receive information associated with a transaction or product offered by the entity). In some implementations, the customer profile data structure may include profiles for customers and/or potential customers of the entity. The customer profile data structure may include any suitable data structure (e.g., a table, an index, a graph, and/or the like) that maps a customer's identification information (e.g., a name, an identification number, and/or the like) to profile information associated with the customer, as described herein. In some implementations, a customer profile data structure may store hundreds, thousands, millions, or more profiles associated with hundreds, thousands, millions, or more customers (or potential customers). As described herein, the customer profile data structure may be a private data structure that includes information that is configured to only be accessible to the entity associated with the product analysis platform.

Thereby, if the user is a customer or potential customer, the product analysis platform may determine a level of interest of the user based on profile information in the customer profile data structure. For example, as described herein, the profile information may include account information associated with the user (e.g., that includes information on one or more accounts (e.g., financial accounts, member accounts associated with the entity, and/or the like)), a purchase history associated with the user, a rental history associated with the user, and/or the like. Accordingly, based on an analysis of the profile information, the product analysis platform may determine a level of interest that the user may have in a particular transaction and/or profile.

As a specific example, from an analysis of the profile information, the product analysis platform may identify from the purchase history that the user currently owns a particular vehicle (i.e., a product) and that the user has a loan (i.e., engaged in a transaction) to pay for the vehicle. Such information may indicate a particular type of product (a type of vehicle that is similar to or related to the vehicle) that the user may likely purchase and/or that the user may be interested in a particular type of transaction (a type of transaction that is similar to or related to the loan or a refinance of the loan). Furthermore, the purchase history may indicate that the vehicle is reaching an age at which the user may have an interest in replacing the vehicle (e.g., based on the date of the purchase, based on trends in the purchasing history, and/or the like), that terms of the corresponding existing loan are less favorable than terms of one or more other loans that are available to the user, that the duration of the existing loan is reaching an expiration date, and/or the like. Therefore, based on such information, the product analysis platform may determine that the user may have a threshold level of interest in a particular transaction and/or a particular product. In some implementations, the product analysis platform may then determine a user identity (if not previously obtained) and/or send a request to the user for identifying information. In some embodiments, the request may be a request for the user to provide an image of the user's face. For example, the request may indicate that the user may quickly and/or easily engage in an available transaction and/or acquire an available product is available by simply providing an image of the user's face. Further, the request may indicate that the image of the user's face may only be used for the purposes of identifying the user to permit the user to obtain information associated with the transaction and/or product, engage in the transaction, be preauthorized for the transaction, and/or the like. Furthermore, the request may explain that if the user provides the image of the user's face, the user will not need to provide any other identifying information in order to obtain information associated with the transaction and/or product, engage in the transaction, be preauthorized for the transaction, and/or the like.

Accordingly, by analyzing profile information of a profile of the user, the product analysis platform may proactively determine the level of interest of the user based on the profile in the customer profile data structure. The level of interest may correspond to a probability that the user would or is going to engage in the transaction (or a similar or related transaction) and/or a probability that the user would or is going to acquire (e.g., purchase, rent, and/or the like) the product (or a similar or related product). Therefore, in some implementations, when the product analysis platform determines that the level of interest satisfies a threshold level of interest, the product analysis platform may send a request to the user device and/or prompt (e.g., via an application of the user device) the user to provide an image of the user's face (e.g., to verify the user). Accordingly, based on determining the level of a user's interest in a transaction and/or a product, the product analysis platform may obtain an image of the user's face to permit the product analysis platform to verify the user based on the image of the user and provide information associated with the transaction and/or the product based on profile information associated with the user in the customer profile data structure. In some implementations, the product analysis platform may verify the user based solely on the image of the user.

In some implementations, the threshold level of interest used to determine whether to send a request to the user and/or prompt the user to provide an image of the user's face to provide information associated with a transaction and/or product may be specific to the transaction, the product, the user, and/or the like. For example, the threshold level of interest may be higher when the transaction involves a refinance versus when the transaction involves a new loan, or the threshold level of interest may be higher when the product is a car versus when the product is a house (or vice versa). Furthermore, the threshold level of interest may be specific to a particular user. For example, depending on a purchasing tendency of the user (e.g., as determined from the purchase history and/or the rental history in the profile of the user) and/or a rental tendency (e.g., as determined from the rental history), the threshold level of interest may be higher if the user infrequently engages in a certain transaction involving a certain product, and lower if the user frequently engages in a certain transaction involving a certain product.

In some implementations, the product analysis platform may use a machine learning model, such as a user interest model, to determine from the profile of a user that the user is likely to engage in a transaction involving a product. For example, the product analysis platform may train the user interest model based on one or more parameters associated with determining a probability that the user is likely to engage in the transaction involving the product. Such parameters may include a product and/or a transaction identified in the purchase history and/or the rental history; a type of a product and/or a type of a transaction in the purchase history and/or the rental history; a time period and/or timing associated with a transaction and/or a product identified in the purchase history and/or rental history (e.g., a length of time between rentals for one or more products, a time of day, week, month, year, and/or the like, associated with the rentals and/or the products, and/or the like); whether a transaction and/or product is in the purchase history, the rental history, or the purchase history and the rental history; one or more entities associated with a transaction and/or a product in the purchase history and/or rental history; a location associated with a transaction and/or a product in the purchase history and/or rental history; account information (e.g., information on financial accounts of the user, information on member accounts of the user, information on a credit history of the user, and/or the like), and/or the like.

In some implementations, the product analysis platform may train the user interest model using historical data associated with the user and/or a plurality of other users engaging in similar transactions, according to the one or more parameters. Additionally, or alternatively, the product analysis platform may train the user interest model using historical data associated with engaging in one or more other transactions and/or one or more other products (e.g., one or more other products associated with the product) according to the one or more parameters. Using the historical data and the one or more parameters, associated with determining a probability that a user is likely to engage in a transaction involving a product, as inputs to the user interest model, the product analysis platform may determine a probability that the user is likely to engage in a transaction for a product, to determine whether to perform one or more processes associated with the transaction as described herein.

In this way, the product analysis platform may identify one or more characteristics associated with a transaction, a product, and/or a user, one or more characteristics associated with providing information associated with the product and/or the transaction to the user, and/or one or more characteristics associated with performing a preauthorization process for the transaction involving a product and/or the user, as described herein. Based on applying a rigorous and automated process associated with using a facial recognition analysis to provide a transaction and/or product recommendation to a user, the product analysis platform enables recognition and/or identification of thousands or millions of transactions, products, profiles, and/or users for thousands or millions of recommendations for transactions and/or processes and/or for thousands or millions of preauthorization processes for transactions and/or processes, thereby increasing an accuracy and consistency of providing information associated with a transaction and/or a product and/or enabling the user to more quickly and easily engage in a transaction for a product relative to requiring computing resources to be allocated for hundreds or thousands of entity representatives to manually research, identify, and provide information associated with transactions and/or products and/or enable the user to engage in a particular transaction for a particular product from the thousands or millions of transactions, products, profiles, and/or users.

As described herein, the user providing an image of the user's face may serve as an authorization to identify the user, an authorization to identify one or more transactions or one or more products that may be of interest to the user, and/or an authorization to perform a preauthorization process (which may involve a review of the user's profile, a review of the user's credit, and/or the like). In some implementations, the user device may provide authorization information to the user (e.g., via a user interface of the user device) that indicates that by providing an image of the user's face (e.g., via a camera of the user device, via an application of the user device, and/or the like), the user authorizes the product analysis platform to perform one or more of the processes described herein (e.g., performing a facial recognition analysis of the image, determining an identity of the user and/or identification of the user, generating and/or accessing a profile of the user, performing a preauthorization process based on the profile of the user, provide information associated with a transaction and/or product to the user, recommend a transaction and/or product to the user, and/or the like). In some implementations, the authorization information may be provided to the user when the user opens an application associated with performing one or more processes described herein, the authorization information may be provided to the user when the user registers an account associated with the entity of the product analysis platform, the authorization information may be provided via a prompt that is presented in association with the application and/or the user device capturing the image of the user's face, and/or the like. In some implementations, the user device (e.g., a kiosk device of a branch location associated with the entity) may be associated with a display that indicates, to the user, that the user, by providing an image of the user's face, authorizes the product analysis platform to perform one or more processes described herein.

Accordingly, to maintain privacy of the user associated with profile information associated with the user, and/or the like, the product analysis platform may ensure that the user actively opts-in (e.g., via an acknowledgement of the authorization, via providing the image of the user's face, and/or the like) to obtain information associated with the transaction and/or product, engage in the transaction, be preauthorized for the transaction, and/or the like. Accordingly, the product analysis platform may be configured to abide by any and all applicable laws with respect to maintaining the privacy of the user and/or content of the profile associated with the user. In some implementations, the product analysis platform may anonymize and/or encrypt any private information associated with the profile, and/or the like. In some implementations, the product analysis platform may have or be configured to have limited access to certain information in the profile of the user. For example, the product analysis platform may be configured to only have access to the profile of the user for a threshold time period associated with receiving the image of the user's face (e.g., five minutes, ten minutes, an hour, and/or the like), to only have access to a limited portion of the profile (e.g., only account information, only purchase history, only rental history, and/or the like), and/or the like.

In this way, the product analysis platform may determine that the user is interested in a transaction and/or a product and/or receive an image of the face of the user to permit the product analysis platform to determine an identity of the user.

As further shown in FIG. 1A, and by reference number 120, the product analysis platform may determine an identity of the user solely from the image of the user's face and may identify a profile of the user based on the identity. For example, the product analysis platform may use a facial recognition module to perform a facial recognition analysis to determine an identity of the user (e.g., by identifying identification information associated with the user). In some implementations, the facial recognition module may perform the facial recognition analysis to verify an identity of the user. For example, if the product analysis platform determines from a profile of a user that the user is likely interested in a transaction and/or a product, the facial recognition module may perform the facial recognition analysis to verify that the user, that is using the user device and has provided the image, is the user associated with the profile.

As described herein, the facial recognition module may perform any suitable facial recognition analysis. Additionally, or alternatively, the facial recognition module may use one or more artificial intelligence techniques (e.g., machine learning, deep learning, artificial neural network, and/or the like) to perform a facial recognition analysis.

As described herein, the facial recognition module may have access to an identification data structure that stores image identifications (e.g., identification cards that include images of faces) of customers and/or potential customers associated with the product analysis platform. For example, the identification data structure may store a copy of one or more government-issued identification cards (e.g., a driver's license, a state issued identification card, an employee identification card, and/or the like) that were provided to the entity associated with the product analysis platform by customers entering into a transaction with the entity and/or by potential customers providing copies of respective image identifications to the entity. In some implementations, the identification data structure may be included within a customer profile data structure. Accordingly, if an image identification of the user is in the customer profile data structure, the facial recognition module, via the facial recognition analysis, may determine an identity of the user and/or obtain identification information associated with the user.

Additionally, or alternatively, the identification data structure may be a separate data structure than the customer profile data structure. For example, the facial recognition module may use one or more publicly available data structures that store images of users (e.g., including potential customers) for the facial recognition analysis. The facial recognition module may access such a publicly available data structure (i.e., a data structure that is not owned, operated, or affiliated with the entity associated with the product analysis platform) via one or more networks and/or a communication link between the product analysis platform and the publicly available data structure. Such a publicly available data structure may include a government-operated data structure (e.g., a department of motor vehicles data structure, a law enforcement data structure, and/or the like), and/or an entity-operated data structure (e.g., a data structure that includes image identifications that an entity acquired and made available (e.g., using a fee or subscription service)).

In some implementations, the product analysis platform may train a facial recognition model associated with a facial recognition module using one or more facial recognition model training techniques, such as a neural network technique, and/or the like. For example, the product analysis platform may perform an artificial neural network processing technique (e.g., using a two-layer feedforward neural network architecture, a three-layer feedforward neural network architecture, and/or the like) to perform pattern recognition with regard to patterns of whether an image of the user's face can be used to identify a user or not. In this case, using the artificial neural network processing technique may improve an accuracy of the facial recognition model used by the facial recognition module of the product analysis platform, by being more robust to noisy, imprecise, or incomplete data, and/or by enabling the facial recognition module (and/or product analysis platform) to detect patterns and/or trends undetectable to human analysts or systems using less complex techniques.

In this way, the product analysis platform may determine the identity of the user based solely on an image of the user's face to permit the product analysis platform to identify profile information associated with the user and/or to provide information associated with a transaction and/or product to the user. In some implementations, the facial recognition module may be implemented and/or associated with a third-party entity that is associated with the entity. For example, the third-party entity may perform the facial recognition analysis as a service for the entity. In such cases, the product analysis platform may obtain the identification information from the third-party entity.

In some implementations, the product analysis platform may identify the profile of the user based on the identity (e.g., determined solely from the image of the user's face). For example, the product analysis platform may identify identification information associated with the user based on the facial recognition analysis, and determine, from the identification information, that a profile in the customer profile data structure includes the identification information. As mentioned above, the profile associated with the user may include identification information, account information, a purchase history, a rental history, and/or the like. In this way, the product analysis platform may identify the profile from the identification information in the profile to permit the product analysis platform to determine one or more characteristics of the user (e.g., a physical trait of the user, a family trait of the user, a purchase tendency of the user, a rental tendency of the user, and/or the like) based on the profile information in the profile.

In some implementations, the product analysis platform may generate a profile in the customer profile data structure based on the identification information determined from the user. For example, if a profile of the user was not in the customer profile data structure, but the facial recognition module identified the user based on an identification card associated with the user (e.g., from a publicly available data structure), the product analysis platform may add a profile of the user in the customer profile data structure. Furthermore, the product analysis platform may include profile information in the added profile based on information from the identification card that was used to determine the identity of the user. For example, the product analysis platform may obtain a name, a date of birth, one or more physical traits (e.g., height, weight, eye color, hair color, and/or the like), a sex/gender, an issue date and/or expiration date of the identification card, and/or the like from the identification card, and add that information to the profile as profile information of the user.

In some implementations, the product analysis platform may use a machine learning model, such as a profile identification model, to identify a profile. For example, the product analysis platform may train the profile identification model based on one or more identification parameters associated with identifying a profile of a user, such as identification information of the user (e.g., name, identification number, a biometric (e.g., a face), and/or the like). The product analysis platform may train the profile identification model using historical data associated with identifying a profile according to the one or more identification parameters. Using the historical data and the one or more identification parameters as inputs to the profile identification model, the product analysis platform may identify the profile of the user to permit the product analysis platform to determine a transaction in which the user may be interested in engaging and/or a product that the user may have an interest in acquiring.

In this way, the product analysis platform may determine an identity of a user and corresponding profile information associated with the user based solely on the image of the user's face. Accordingly, the user may not have to provide such profile information to the product analysis platform, which would involve consuming computing resources (e.g., used to prompt the user for profile information, receive the profile information, and/or the like) and/or network resources (e.g., network resources used to send the profile information).

As further shown in FIG. 1A, and by reference number 130, the product analysis platform determines and/or identifies, based on the profile, transaction information and/or product information to provide to the user. In some implementations, the product analysis platform may use the product processing model, which may be a machine learning model, to determine and/or identify the transaction information and/or product information.

As described herein, the transaction information may be any information associated with the transaction that identifies one or more characteristics of the transaction (which may be referred to herein as "transaction characteristics"). A transaction characteristic may include a type of the transaction, one or more terms of the transaction (e.g., an interest rate of the transaction, a duration of the transaction, a payment amount of the transaction, a payment plan associated with the transaction, and/or the like), collateral involved in the transaction (which may include information associated with the product), and/or the like. Furthermore, the product information may be any information associated with the product that identifies one or more characteristics of the product (which may be referred to herein as "product characteristics"). A product characteristic may include a location associated with the product, a dimension of the product, a specification of the product, a feature of the product (e.g., a standard feature, an option, an addon, and/or the like), a value (e.g., a market value, a listed value, and/or the like) associated with the product, a style of the product, a color of the product, a make and/or model of manufacture of the product, and/or the like.

In some implementations, the product analysis platform may determine whether an available transaction (e.g., a transaction offered by the entity to customers and/or potential customers) and/or a product in an inventory (e.g., an inventory or list of products associated with the entity) is associated with a transaction and/or product that may be of interest to the user, to permit the product analysis platform to provide information associated with the transaction and/or the product to the user (e.g., to recommend and/or present a targeted offer for the transaction and/or product), as described herein. For example, using transaction characteristics and/or product characteristics, the product analysis platform may determine whether an available transaction and/or a product in an inventory is or can be a transaction and/or a product that is to be recommended to the user and/or to be offered to the user. In this case, the product analysis platform may use a product processing model. For example, the product analysis platform may train the product processing model using information that includes a plurality of transactions (e.g., transactions associated with the user or other users), a plurality of products, and/or the like, to determine whether information associated with a transaction and/or a product is to be provided and/or offered to the user.

As an example, the product analysis platform may determine that past transactions and/or identifications of products are associated with a threshold probability of being of interest to the user and/or one or more other users. In this case, the product analysis platform may determine that a relatively high score (e.g., as being likely to be identified as being of interest to the user) is to be assigned to the transactions and/or products that are determined to be the same or similar as previously performed transactions and/or identifications of products that were of interest to the user and/or the one or more other users (or more frequently identified than past identified transactions and/or products). In contrast, the product analysis platform may determine that a relatively low score (e.g., as being unlikely to be identified as being of interest to the user) is to be assigned to transactions and/or products that are determined to be different than previously performed transactions and/or identifications of products that were of interest to the user and/or the one or more other users (or less frequently identified than past identified transactions and/or products).

According to some implementations, the product analysis platform may determine one or more transactions and/or one or more products that may be of interest to the user based on one or more characteristics of the user (which may be referred to herein as "user characteristics") in the profile of the user. For example, such user characteristics may include a physical trait of the user, a location associated with the user (e.g., a home address, a work address, and/or the like), a number of authorized users associated with the user (e.g., indicating a size of the user's family), a purchase tendency of the user, a rental tendency of the user, account information associated with the user, a score (e.g., a credit score, a customer score generated and/or maintained by the entity, and/or the like) indicating that the user is eligible to purchase the product, and/or the like. Using the one or more characteristics of the user, the product analysis platform, via the product processing model, may select a transaction and/or a product to recommend to the user (e.g., by providing the transaction information and/or product information to the user). In some implementations, the product processing model may select, based on the one or more characteristics of the user, a transaction and/or a product from a plurality of available transactions and/or a plurality of available products (e.g., in an inventory) and provide information associated with the transaction and/or information associated with the product to the user based on the transaction characteristics, the product characteristics, and/or the user characteristics.

In some implementations, the product analysis platform may train a machine learning model, such as a selection model of the product processing model, based on one or more selection parameters associated with selecting a transaction and/or a product to recommend to the user and/or offer to the user. The one or more selection parameters may include the transaction characteristics, the product characteristics, and/or the user characteristics, and/or the like. The product analysis platform may train the selection model using historical data associated with selecting a transaction and/or a product according to the one or more selection parameters for the user and/or other users (e.g., customers associated with the entity, potential customers associated with the entity, and/or the like). Using the historical data and the one or more selection parameters as inputs to the selection model, the product analysis platform may select a transaction and/or a product to permit the product analysis platform to provide information associated with the transaction and/or product to the user, to perform a preauthorization process associated with the transaction and/or product, to permit the user to engage in the transaction for the product, and/or the like.

In this way, the product analysis platform may determine and/or identify a transaction and/or a product that may be of interest to the user, determine transaction information and/or product information associated with the transaction and/or product, and provide the transaction information and/or product information (e.g., as a recommendation and/or a targeted offer) to the user to permit the user to engage in the transaction and/or acquire the product (e.g., via the transaction). Accordingly, as described herein, the product analysis platform may automatically select and provide transaction information and/or product information to a user based on receiving an image of the user's face.

As further shown in FIG. 1A, and by reference number 140, the product analysis platform may perform a preauthorization process for the transaction and/or for a transaction involving the user and the product. The preauthorization process may involve any suitable analysis to determine a probability that the user is eligible to engage in a transaction (e.g., a likelihood that the user is going to abide by the terms of the transaction (e.g., make timely payments, provide adequate collateral, and/or the like)). In some implementations, the preauthorization process may involve obtaining information from one or more external information platforms (e.g., a credit bureau platform, a government-operated platform, a fraud analysis platform, and/or the like) to determine whether the user is eligible to engage in a transaction.

In some implementations, the product analysis platform, via the product processing model, may perform a preauthorization process that is based on account information associated with the user, one or more characteristics of the transaction, one or more characteristics of the product, and/or the like. For example, the product analysis platform may determine (e.g., using a linear regression technique) that a threshold percentage of low eligibility indicators (e.g., low income, low credit score, low customer score, short credit history (e.g., few purchases in purchase history, short amount of time since first transaction), and/or the like) in a set of eligibility indicators, indicate that the user is ineligible to enter into a transaction, and may determine that those low eligibility indicators are to be assigned relatively low eligibility scores. In contrast, the product analysis platform may determine that another threshold percentage of high eligibility indicators (e.g., high income, high credit score, high customer score, long credit history (e.g., many transactions in purchase history, long amount of time since first transaction, and/or the like)) indicate that the user is eligible to enter into a transaction and may assign a relatively high eligibility score to those high eligibility indicators. In some implementations, based on certain eligibility indicators indicating eligibility or ineligibility for a transaction, the product analysis platform may generate a preauthorization model of the product processing model and may use the preauthorization model for analyzing new eligibility indicators that the product analysis platform identifies and/or analyzes during a preauthorization process.

Accordingly, the product analysis platform may use a preauthorization model to perform a preauthorization process, as described herein. For example, the product analysis platform may train the preauthorization model based on one or more preauthorization parameters associated with preauthorizing a transaction involving a user and/or a product, such as one or more characteristics of the transaction, one or more characteristics of the product, one or more user characteristics of the user, and/or the like. The product analysis platform may train the preauthorization model using historical data associated with preauthorizing the user and/or one or more other users according to the one or more preauthorization parameters. Using the historical data and the one or more preauthorization parameters as inputs to the preauthorization model, the product analysis platform may preauthorize a transaction involving a user and/or product to permit the user to engage in the transaction for the product. In this way, the product analysis platform may automatically preauthorize the transaction for the product and/or authorize the transaction for the product to permit the user to acquire the product. Accordingly, the product analysis platform may conserve computing resources that may otherwise have been wasted on a user submitting an application to engage in the transaction for the product, reviewing the application, and/or authorizing the transaction for the product. Furthermore, the product analysis platform preauthorizing the transaction may improve a user experience associated with applying to engage in a transaction for the product as the user does not have to wait for authorization to engage in the transaction.

In some implementations, the product analysis platform may determine one or more parameters associated with the transaction. For example, the product analysis platform may determine that a plurality of available transactions for a product include a plurality of different terms (e.g., different interest rates, different durations, different payment plans, different down payment amounts, and/or the like). The product analysis platform may perform the preauthorization process for each of the available transactions, and, according to the preauthorization process, may determine which of the available transactions can be offered to the user based on whether the user is eligible for those transactions. Additionally, or alternatively, the product analysis platform may perform the preauthorization process to determine an eligibility score associated with the user. In some implementations, each of the plurality of available transactions may be assigned a particular eligibility score range. As such, the product analysis platform may offer the available transactions, to the user, that have an eligibility score range that includes the eligibility score associated with the user.

In some implementations, to perform the preauthorization process for a transaction, the product analysis platform may automatically generate an application (e.g., a digital document) for a transaction and submit the application for the transaction to a preauthorization platform (e.g., a platform that may be separate from the product analysis platform). Accordingly, the product analysis platform may populate one or more fields of the application for the transaction with corresponding information from the profile information of the user. In this way, the product analysis platform may automatically generate an application for a transaction (e.g., based solely on receiving the image of the user's face), which may enhance the user experience (the user does not need to spend the time to fill out the application), and conserve computing resources (e.g., processing resources associated with receiving user inputs for the application for the transaction, memory resources to store the user inputs as information for the application for the transaction, power resources to power a user device to receive the user inputs, and/or the like).

In this way, the product analysis platform may perform a preauthorization process associated with a transaction for a product to permit the user to engage in the transaction for the product (e.g., if the user accepts an offer to engage in the transaction).

As further shown in FIG. 1A, and by reference number 150, the product analysis platform provides the transaction information and/or the product information to the user device. In some implementations, the product analysis platform may provide the transaction information and/or the product information as a recommendation associated with the transaction and/or product and/or an offer associated with the transaction and/or the product. For example, the transaction information and/or product information may include a recommendation and/or an offer to engage in the transaction, a recommendation and/or an offer to acquire the product, a recommendation and/or an offer to engage in the transaction for the product, and/or the like.

In some implementations, the product information and/or the transaction information may be provided to the user based on the preauthorization process performed by the product analysis platform. For example, if the product analysis platform determines that the user is eligible for a transaction involving a product, the product analysis platform may provide the transaction information and/or the product information. On the other hand, if the product analysis platform determines that the user is not eligible to engage in a transaction for the product, the product analysis platform may indicate that there are no transactions and/or products available for the user (and/or that the user is not eligible for any transactions and/or products offered by the entity).

In some implementations, the product analysis platform may provide the transaction information and/or the product information for display to the user to permit the user to review the transaction information and/or product information. The transaction information and/or the product information may be provided for display via the user device of FIG. 1A (e.g., the same user device that was used by the user to provide the image of the user's face) and/or any other user device or system associated with the user (e.g., a messaging system that includes an email account, a text messaging account, an instant messaging account, and/or the like).

In some implementations, the product analysis platform may enable a user to engage in the transaction via the transaction information and/or product information provided to the user. For example, the transaction information and/or product information may include a prompt to permit the user to engage in the transaction. The prompt may include a clickable icon and/or one or more other types of selectable graphical user interface elements to permit the user to agree to the terms of the transaction and engage in the transaction for the product. The prompt may include information associated with the terms of the transaction, the characteristics of the product, and/or the like. Accordingly, the product analysis platform may automatically enable a user to enter into a transaction with the entity for a product (e.g., to permit the user to acquire the product).

In this way, the product analysis platform enables transaction information and/or product information to be provided to a user based on receiving an image of the user's face. Therefore, the product analysis platform may automatically generate and/or provide a recommendation to a user and/or a targeted offer associated with a transaction and/or a product to permit the user to quickly and effectively engage in the transaction and/or identify or acquire the product.

Figure 1B:
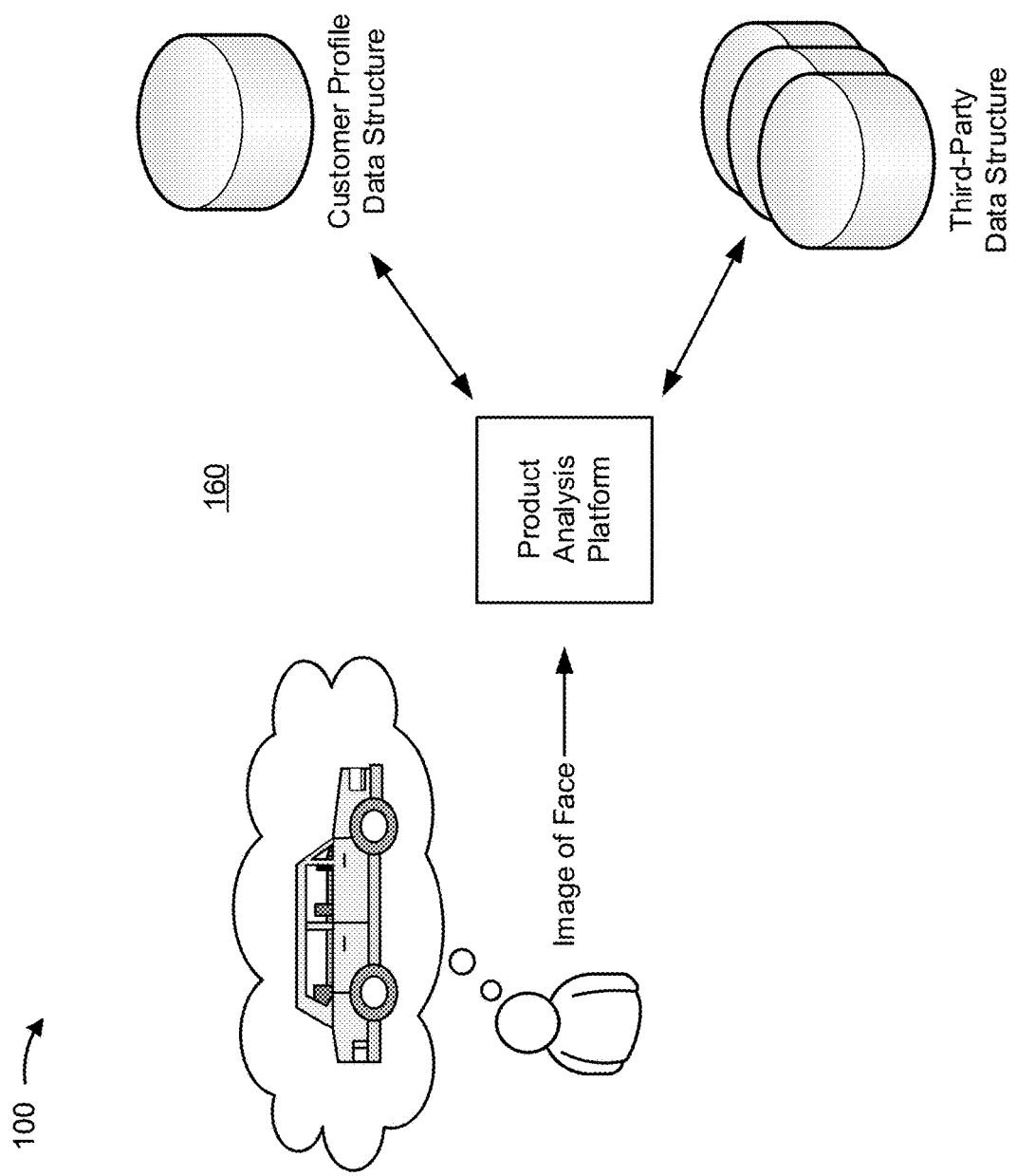
Figure 1C:
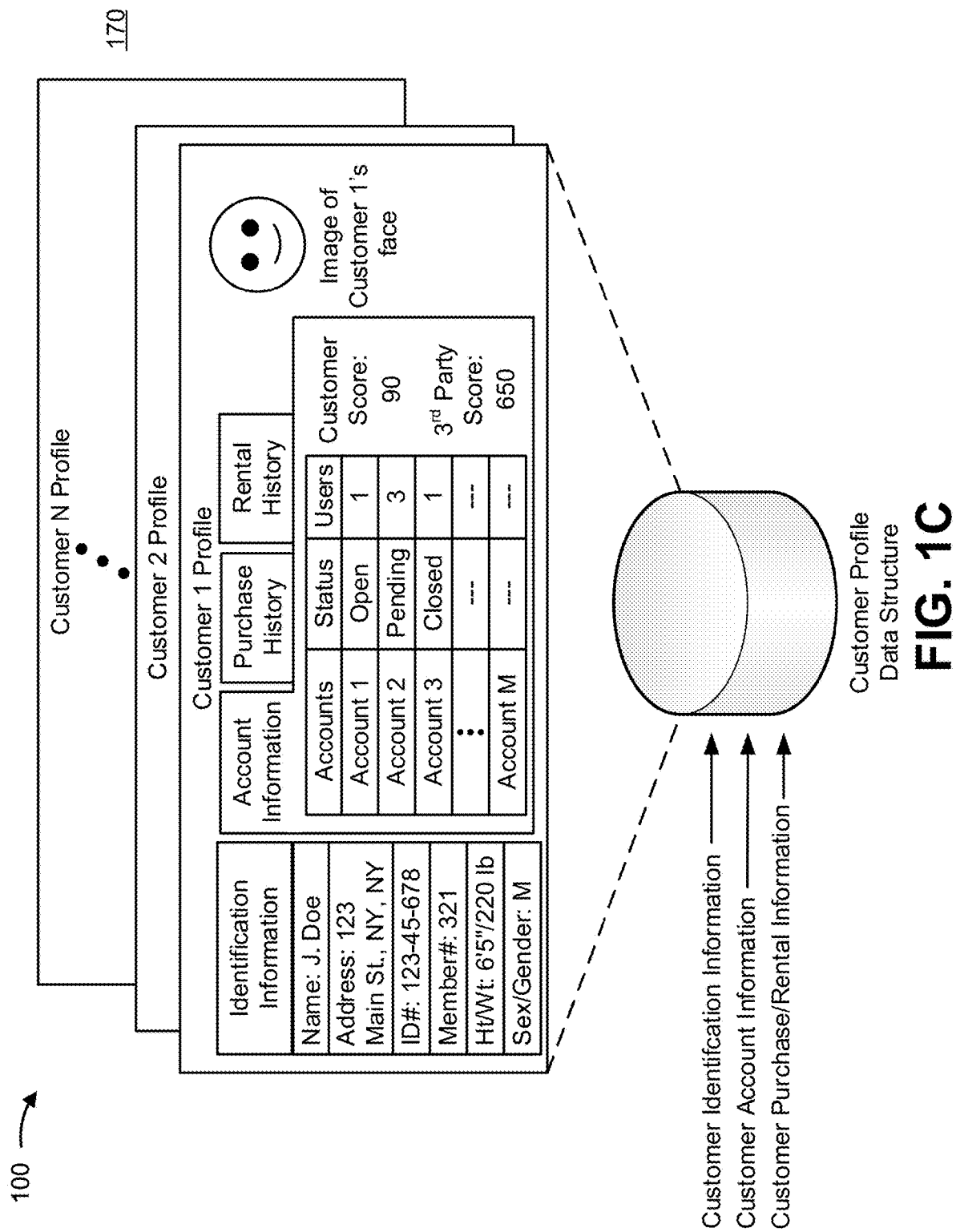
Figure 1D:
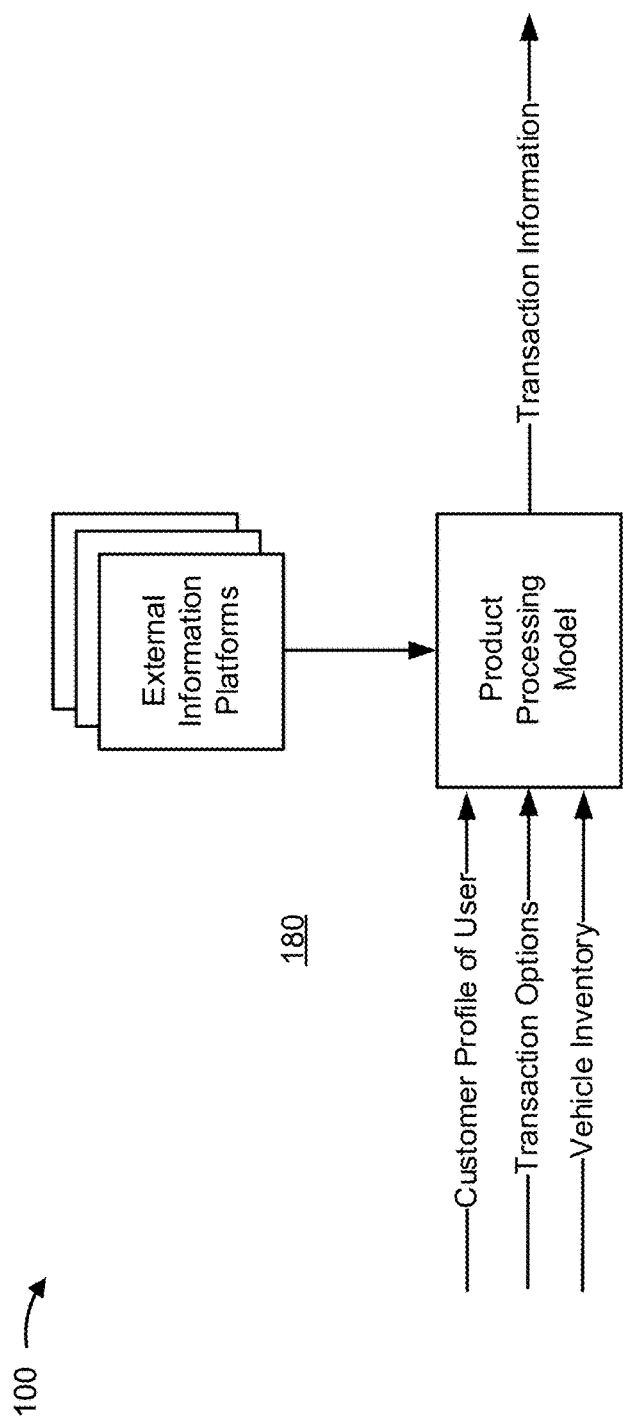

As described herein, FIGS. 1B-1D include implementations associated with the product analysis platform. In connection with example implementation 100, in FIGS. 1B-1D, a user, Customer 1, may have an interest in purchasing a vehicle. As shown in FIG. 1B, and by reference number 160, an image of Customer 1's face is provided to the product analysis platform, and the product analysis platform may use a plurality of different data structures to determine an identity of Customer 1 and/or determine profile information associated with Customer 1. For example, as described herein, the product analysis platform may determine the identity of Customer 1 (e.g., according to a record of identification information) using a facial recognition analysis based on images in a third-party data structure (e.g., a publicly available data structure) and/or identification information from the customer profile data structure.

As a more specific example, assume Customer 1 is a potential customer of an entity associated with the product analysis platform. In such a case, Customer 1 may have provided some identification information to the entity, which may be included with the customer profile data structure. However, such information may not have included an image of the Customer 1's face. Accordingly, the product analysis platform, via a facial recognition module, may determine the identity of the user using one of the third-party data structures (e.g., a government-operated data structure, a data structure associated with a social media provider, a data structure associated with an image search engine, and/or the like) that includes an image identification of Customer 1. The product analysis platform may then use identification information (e.g., a name, an identification number, and/or the like) to identify Customer 1 in the customer profile data structure.

The product analysis platform may obtain data from the plurality of different data structures based on the identity of Customer 1 without any other information associated with Customer 1 being received. For example, once the image of Customer 1's face is obtained, the product analysis platform can determine the identity of Customer 1, and then obtain information (e.g., physical trait information, account information (e.g., credit information, a credit score, a credit report, and/or the like)) associated with Customer 1 from the third-party data structures. Accordingly, the product analysis platform may access and analyze data from a plurality of data structures based solely on an image of Customer 1's face.

In some implementations, the product analysis platform may determine whether a user is associated with one or more customer profiles (e.g., identifiers), as described herein. For example, using data associated with the user, the product analysis platform may determine whether a profile is associated with the user (e.g., if the user is associated with particular identification information). In this case, the product analysis platform may use a user representation model. For example, the product analysis platform may train the user representation model using information that includes a plurality of identification information of users and/or customers (e.g., names, identification numbers, and/or the like), a plurality of characteristics associated with the users and/or customers (e.g., locations, physical traits, and/or the like), to identify whether an identified user is associated with a particular customer and/or a probability that the user is associated with the particular customer.

In some implementations, if the product analysis platform determines that a profile associated with a particular user is not in the customer profile data structure, the product analysis platform may generate a profile for the user in the customer profile data structure using information from the third-party data structures. For example, the product analysis platform may add the user's name, height, weight, address, sex/gender, the image of the user's face, and/or the like from the third-party data structure to the profile of the user. In doing so, the product analysis platform may be configured to abide by any and all applicable laws and/or permission of the third-party data structures with respect to maintaining the privacy of the user and/or obtaining identification information from the image identification associated with the user.

In this way, the product analysis platform may use a plurality of data structures to identify a user based solely on an image of the user's face to permit the user to receive information associated with a transaction and/or information associated with a product and/or to permit the user to engage in a transaction involving a product, as described herein.

As shown in FIG. 1C, and by reference number 170, the customer profile data structure includes one or more profiles of N customers (where N≥1, and N is an integer). As shown, the customer profile data structure receives customer identification information, customer account information, and customer purchase and/or rental information. The customer profile data structure may sort the customer identification information, customer account information, and customer purchase and/or rental information into corresponding profiles of the customers of the entity.

In the example of FIG. 1C, assume Customer 1 is a customer of the entity associated with the product analysis platform. Accordingly, a customer profile associated with Customer 1 may include identification information of Customer 1, account information associated with Customer 1, a purchase history associated with Customer 1, and a rental history associated with Customer 1. The identification information and the account information are presented for display in FIG. 1C, and the purchase history and rental history are included as tabs within the profile. Furthermore, the profile of Customer 1 may include an image of Customer 1's face.

Referring to the example above, assume that the product analysis platform has determined that Customer 1 is likely interested in purchasing a new vehicle. According to some implementations described herein, the product analysis platform may provide information associated with a particular vehicle (product) (e.g., to recommend a particular vehicle) to Customer 1 based on receiving the image of Customer 1's face. For example, based on determining that customer is a rather large individual (e.g., based on his height and weight), the product analysis platform may identify one or more vehicles in an inventory that may be comfortable for such a large individual (e.g., a full-size sedan, a full-size sport utility vehicle, a full-size truck, and/or the like). In some implementations, the one or more vehicles may be located within a threshold distance of a location associated with Customer 1. For example, the vehicles may be located within 100 kilometers of the address of Customer 1. In this way, transportation costs (e.g., fuel costs, wear and tear of the vehicles and/or a transport vehicle, and/or the like) associated with Customer 1 obtaining the vehicle can be conserved.

Furthermore, as shown, the account information may show a status of M accounts associated with the user (where M≥1, and M is an integer) and/or a number of authorized users associated with one or more of the M accounts. In some implementations, the number of authorized users associated with the M accounts may indicate, to the product analysis platform, whether or not Customer 1 has a family. Accordingly, the product analysis platform may determine that Customer 1 has a family from the three authorized users for account 2, and identify family friendly vehicles (e.g., a van, a sport utility vehicle, and/or the like) that may be useful to Customer 1 and provide information associated with the family friendly vehicles to the user (e.g., as a recommendation and/or an offer).

Furthermore, from the account information, the product analysis platform may identify a customer score and/or a third-party score associated with Customer 1. The customer score may correspond to a score generated by the entity based on Customer 1's transaction history with the entity, based on the statuses of Customer 1's accounts, based on the third-party score, and/or the like. The product analysis platform may calculate the customer score using any suitable technique. Furthermore, the third-party score may correspond to a credit score and/or any other score that has been generated in association with the account information of Customer 1 and/or any other similar account information (e.g., account information from different entities) and/or provided to the entity. Accordingly, the account information may permit the product analysis platform to determine a probability that Customer 1 is eligible to engage in a transaction for a product, as described herein.

As shown in FIG. 1C, Customer 1's profile includes a purchase history and a rental history. The purchase history and the rental history may be used to determine whether a user may have interest in engaging in a particular transaction and/or acquiring a particular vehicle. For example, if the purchase history indicates that Customer 1 has a purchase tendency that involves Customer 1 purchasing a particular vehicle (e.g., a vehicle of a particular make and model) every five years, and the most recent vehicle was purchased approximately five years ago, the product analysis platform may determine that Customer 1 is likely interested in purchasing another vehicle that is the same or similar as the make and model of the previously purchased vehicles. Additionally, or alternatively, the product analysis platform may determine, from the purchase history, types of transactions (e.g., loans, refinances, leases, and/or the like) and/or terms of transactions (e.g., certain interest rates, certain payment amounts, certain durations, and/or the like) in which the user has been engaged. Accordingly, based on the purchase history, the product analysis platform may determine that Customer 1 is likely interested in a transaction that is the same and/or similar to the transactions in the purchase history.

In some implementations, product analysis platform may determine, from a rental tendency of the user as indicated in the rental history, that Customer 1 has a particular interest in a vehicle. For example, if Customer 1 frequently rents a particular type of vehicle (e.g., Customer 1 has rented the vehicle a threshold number of times within a threshold time period), the product analysis platform may determine that Customer 1 is likely interested in purchasing that type of vehicle. Accordingly, the product analysis platform may use the purchase history and/or rental history to determine that Customer 1 may be interested in a particular type of vehicle.

In some implementations, the product analysis platform may use machine learning models, such as a transaction interest model and a product interest model, to determine a probability that the user may engage in a particular transaction and/or may be interested in acquiring a particular product (e.g., based on a purchase tendency of the user, a rental tendency of the user, and/or the like). For example, the product analysis platform may train the transaction interest model based on one or more transaction parameters associated with the user engaging in a transaction (and/or associated with users who have engaged in transactions), such as a number of particular transactions in the purchase history, terms of transactions in the purchase history, timing associated with transactions in the transaction history, and/or the like. Furthermore, the product analysis platform may train the product interest model based on one or more product parameters associated with the user acquiring a product, such as the type of the product, a number of a transactions in the purchase history involving the type of product, timing associated with transactions in the transaction history involving the type of product, product characteristics of products purchased in the transaction history, and/or the like. The product analysis platform may train the transaction interest model and/or product interest model using historical data associated with the user engaging in a transaction and/or acquiring a product according to the one or more transaction parameters and/or product parameters. Using the historical data, the one or more transaction parameters, and/or the one or more product parameters as inputs to the transaction interest model and/or product interest model, the product analysis platform may determine a probability that a user is interested in engaging in a transaction and/or acquiring a product, to permit the product analysis platform to identify the transaction and/or the product and provide transaction information associated with the transaction, product information associated with the product, preauthorize the transaction involving the user, and/or permit the user to engage in the transaction to acquire the product.

In this way, the customer profile data structure may include profile information to permit the product analysis platform to determine and/or identify a transaction in which a user may be interested in engaging, or a product that the user may be interested in acquiring to permit the product analysis platform to perform a preauthorization process and/or provide transaction information associated with the transaction and/or product information associated with the product to the user.

As shown in FIG. 1D, and by reference number 180, the product processing model may receive information associated with a customer profile of Customer 1, information associated with transaction options, and information associated with, for example, a vehicle inventory. The transaction options may be transactions that are offered by the entity associated with the product analysis platform, in which Customer 1 may engage to purchase or lease a vehicle in the vehicle inventory. Furthermore, the product processing model may receive information from one or more external information platforms. As shown in FIG. 1D, the product processing model outputs transaction information and/or product information, which can be provided to Customer 1 (e.g., as a product recommendation and/or an offer to engage in a transaction for a product), as described herein.

In some implementations, the product processing model may determine a plurality of characteristics of Customer 1 based on information (e.g., data) from the profile of Customer 1 (which may have been populated using data from a plurality of data structures). The product processing model may analyze the vehicle inventory based on the plurality of characteristics of Customer 1 and select a vehicle from the inventory of products based on a characteristic of the vehicle that corresponds to one of the plurality of characteristics of Customer 1. Accordingly, the product processing model may instruct the product analysis platform to provide information associated with that vehicle to the user. In some implementations, the product processing model may provide the information associated with the vehicle if a preauthorization process, performed by the product processing model, indicates that Customer 1 is qualified to engage in a transaction for the product.

In some implementations, the product processing model may determine that Customer 1 is likely interested in renegotiating a transaction associated with a vehicle that Customer 1 currently owns (or is in the process of purchasing via the transaction). In other words, the product processing model may determine that Customer 1 is likely interested in refinancing the purchase of Customer 1's current vehicle. For example, the product analysis platform may identify a transaction for Customer 1's current vehicle in the purchase history. The product processing model may determine from a transaction to purchase the vehicle (e.g., from terms of the transaction, such as a relatively high interest rate or payments, relatively long duration of the loan, and/or the like) in the purchase history of Customer 1, from an age of the vehicle, and/or the like, that Customer 1 may want to renegotiate the transaction associated with the vehicle. In some implementations, the product analysis platform may determine a value associated with the vehicle (e.g., a market value of the vehicle, a remaining balance due on the loan, and/or the like). Accordingly, the product processing model (e.g., from receiving information associated with the transaction options) may identify a transaction that may be of interest to Customer 1. For example, the product processing model may determine that Customer 1 would likely be interested in a loan with more favorable terms (e.g., lower interest rate, lower payment amounts, and/or the like) than the current loan involving Customer 1's current vehicle. In some implementations, the product processing model may determine terms of the loan based on a determined value of the vehicle that is to be refinanced. The product processing model may generate the terms of the transaction and provide information associated with the transaction to permit Customer 1 to renegotiate the transaction involving Customer 1's current vehicle.

In some implementations, the product processing model may determine one or more terms for a transaction based on the transaction options, information associated with the user (e.g., profile information), and/or information from the external information platforms (e.g., market information (e.g., associated with interest rates), credit information associated with the user, and/or the like). For example, for a potential transaction that may be offered to the user, the product processing model may determine a potential interest rate for the potential transaction, a potential duration associated with the transaction, and/or the like. Furthermore, if the credit information (e.g., credit history, credit score, credit report, and/or the like) associated with the user indicates that the user is eligible to engage in the potential transaction, the product processing model may preauthorize the potential transaction and/or terms of the potential transaction to permit the user to engage in the potential transaction.

In this way, the product analysis platform may identify characteristics associated with a user (e.g., based on an identity determined solely from an image of the user) and identify characteristics associated with a plurality of transactions and/or characteristics associated with a plurality of products to identify a transaction and/or a product that may be of interest to the user, provide information associated with the transaction and/or information associated with the transaction to the user, perform a preauthorization process associated with the transaction and/or or the product, and/or permit the user to engage in the transaction for the product, as described herein. Based on applying a rigorous and automated process associated with providing transaction information and/or product information to a user (e.g., as a product recommendation and/or an offer to engage in a transaction for the product) and/or enabling the user to engage in a transaction for a product, the product analysis platform enables recognition and/or identification of thousands or millions of characteristics of thousands or millions of transactions and/or recognition and/or identification of thousands or millions of characteristics of thousands or millions of products, thereby increasing an accuracy and consistency of providing information associated with a particular transaction in which the user is likely to engage and/or a particular product that the user is likely to acquire relative to requiring computing resources to be allocated for hundreds or thousands of entity representatives to manually identify thousands or millions of transactions and/or thousands or millions of products for thousands or millions of users. Furthermore, such accuracy and consistency may be increased relative to the product analysis platform (rather than the hundreds or thousands of entity representatives) providing information associated with the thousands or millions of transactions and/or products to the thousands or millions of users to permit the thousands and/or millions of users to engage in thousands or millions of transactions for the thousands or millions of products.

Furthermore, the product analysis platform may improve a user experience associated with identifying a transaction of interest, a product of interest, engaging in a transaction, and/or the like as the product analysis platform may prevent a user from wasting time searching for and/or identifying the transaction and/or product, prevent the user from wasting time associated with being preauthorized and/or authorized to engage in the transaction, prevent the user from wasting time associated with acquiring the product, and/or the like.

As indicated above, FIGS. 1A-1D are provided merely as an example. Other examples may differ from what is described with regard to FIGS. 1A-1D.

Figure 2:
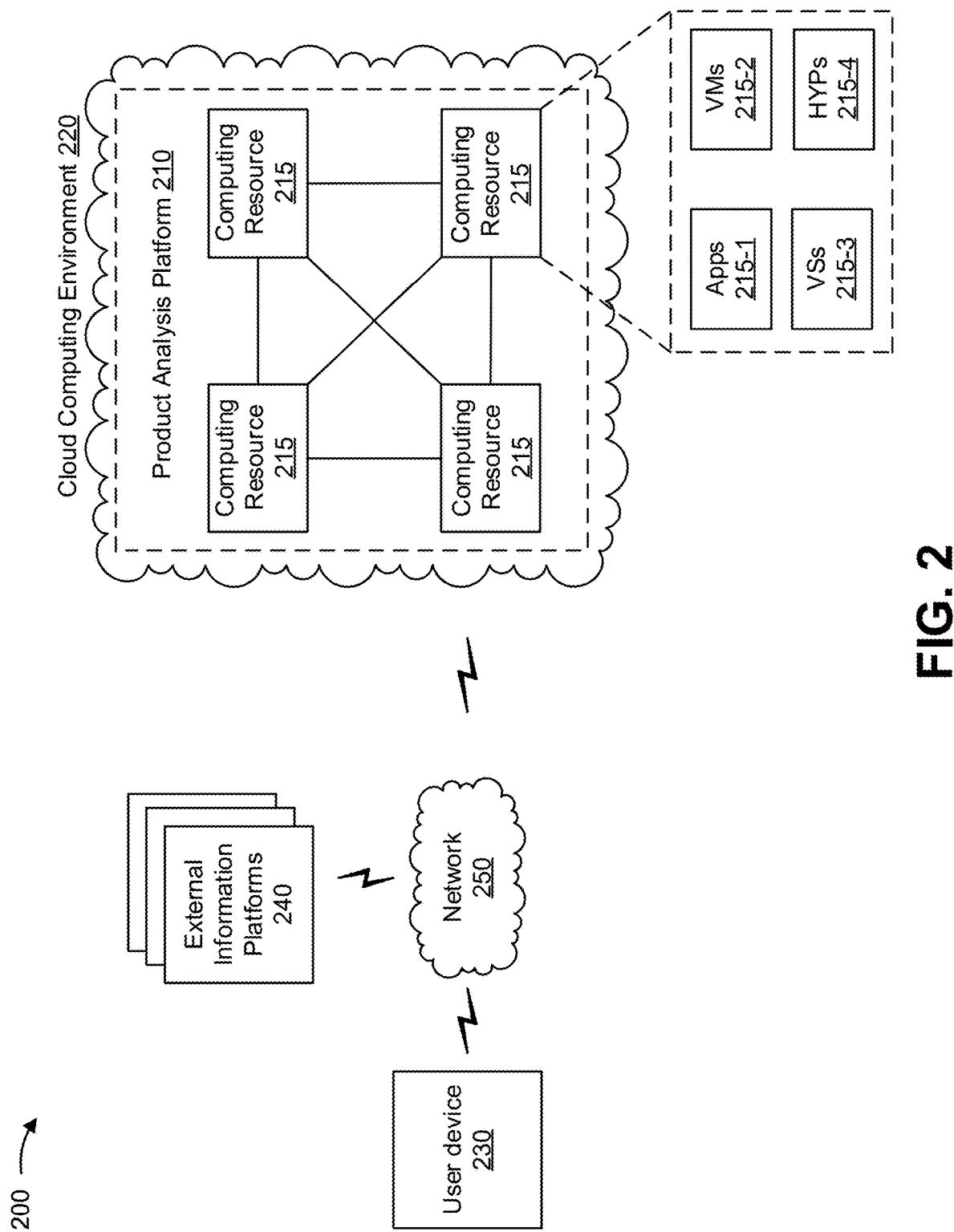
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a product analysis platform 210, a computing resource 215, a cloud computing environment 220, a user device 230, one or more external information platforms 240 (referred to herein individually as "external information platform 240" and collectively as "external information platforms 240"), and a network 250. Devices of environment 200 may interconnect via wired connections, wireless connections, or a combination of wired and wireless connections.

Product analysis platform 210 includes one or more computing resources assigned to perform a facial recognition analysis to provide a transaction and/or product recommendation to a user. For example, product analysis platform 210 may be a platform implemented by cloud computing environment 220 that may determine an identity of a user from an image of the user's face to identify a profile of the user, determine and/or identify, based on the profile, transaction and/or product information, and provide the transaction and/or product information to the user. In some implementations, product analysis platform 210 is implemented by computing resources 215 of cloud computing environment 220.

Product analysis platform 210 may include a server device or a group of server devices. In some implementations, product analysis platform 210 may be hosted in cloud computing environment 220. Notably, while implementations described herein describe product analysis platform 210 as being hosted in cloud computing environment 220, in some implementations, product analysis platform 210 may be non-cloud-based or may be partially cloud-based.

Cloud computing environment 220 includes an environment that delivers computing as a service, whereby shared resources, services, etc. may be provided to user device 230 and/or external information platforms 240. Cloud computing environment 220 may provide computation, software, data access, storage, and/or other services that do not require end-user knowledge of a physical location and configuration of a system and/or a device that delivers the services. As shown, cloud computing environment 220 may include product analysis platform 210 and computing resource 215.

Computing resource 215 includes one or more personal computers, workstation computers, server devices, or another type of computation and/or communication device.

In some implementations, computing resource 215 may host product analysis platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with product analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

User device 230 includes one or more devices capable of receiving, generating, storing, processing, and/or providing information associated with detecting a user's interest in a transaction and/or product, receiving an image of the user's face, providing the image to product analysis platform 210, and receiving transaction and/or product information from product analysis platform 210. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a kiosk device, or a similar type of device.

External information platform 240 includes one or more devices capable of receiving, storing, providing, generating, and/or processing information associated with performing a preauthorization of a transaction. For example, external information platform 240 may include a server device (e.g., a host server, a web server, an application server, etc.), a data center device, or a similar device. As more specific examples, external information platform 240 may include a credit bureau platform, a government-operated platform, a fraud analysis platform, and/or the like.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
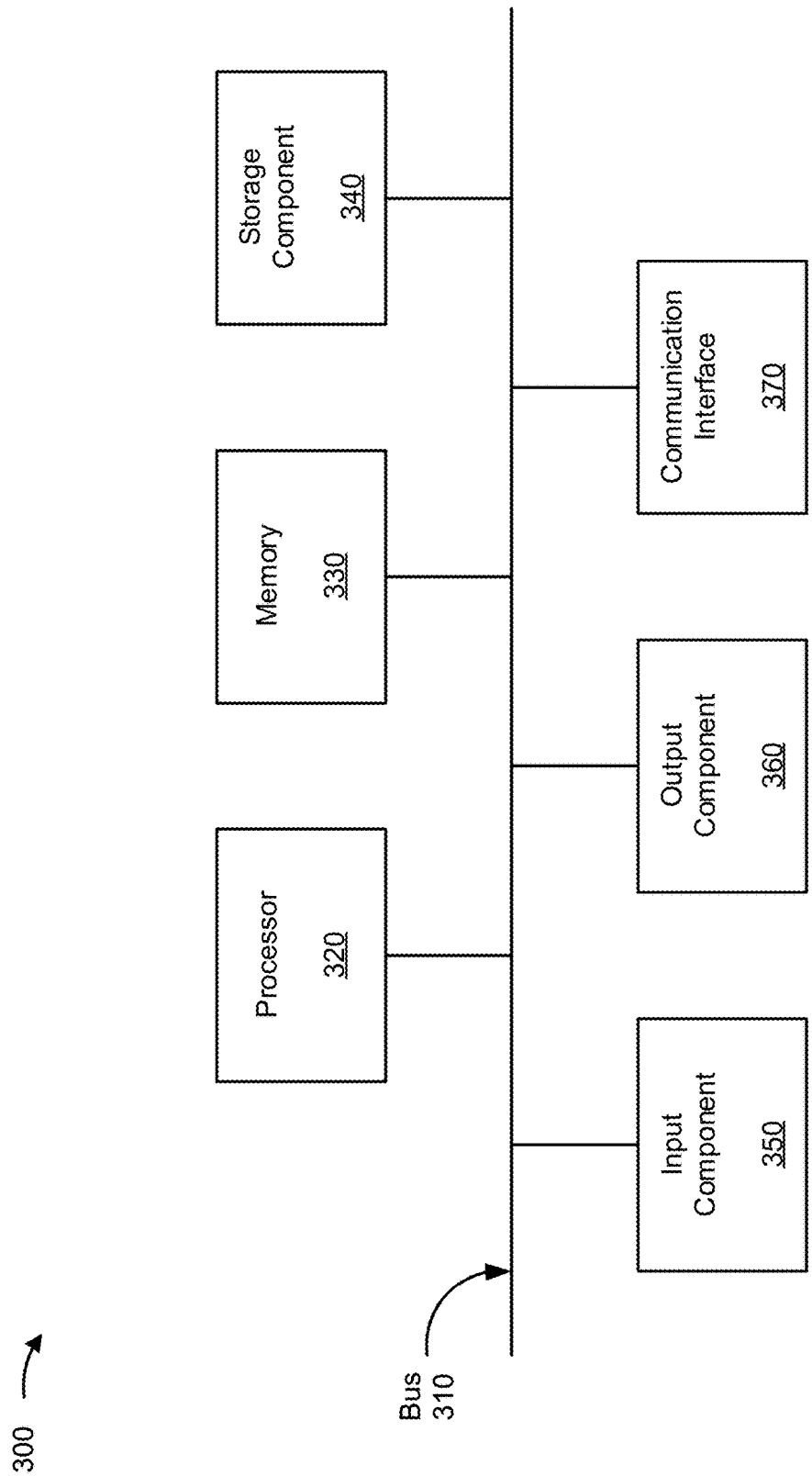
FIG. 3 is a diagram of example components of one or more devices of FIG. 2.

FIG. 3 is a diagram of example components of a device 300. Device 300 may correspond to product analysis platform 210, computing resource 215, user device 230, and/or external information platforms 240. In some implementations, product analysis platform 210, computing resource 215, user device 230, and/or external information platforms 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
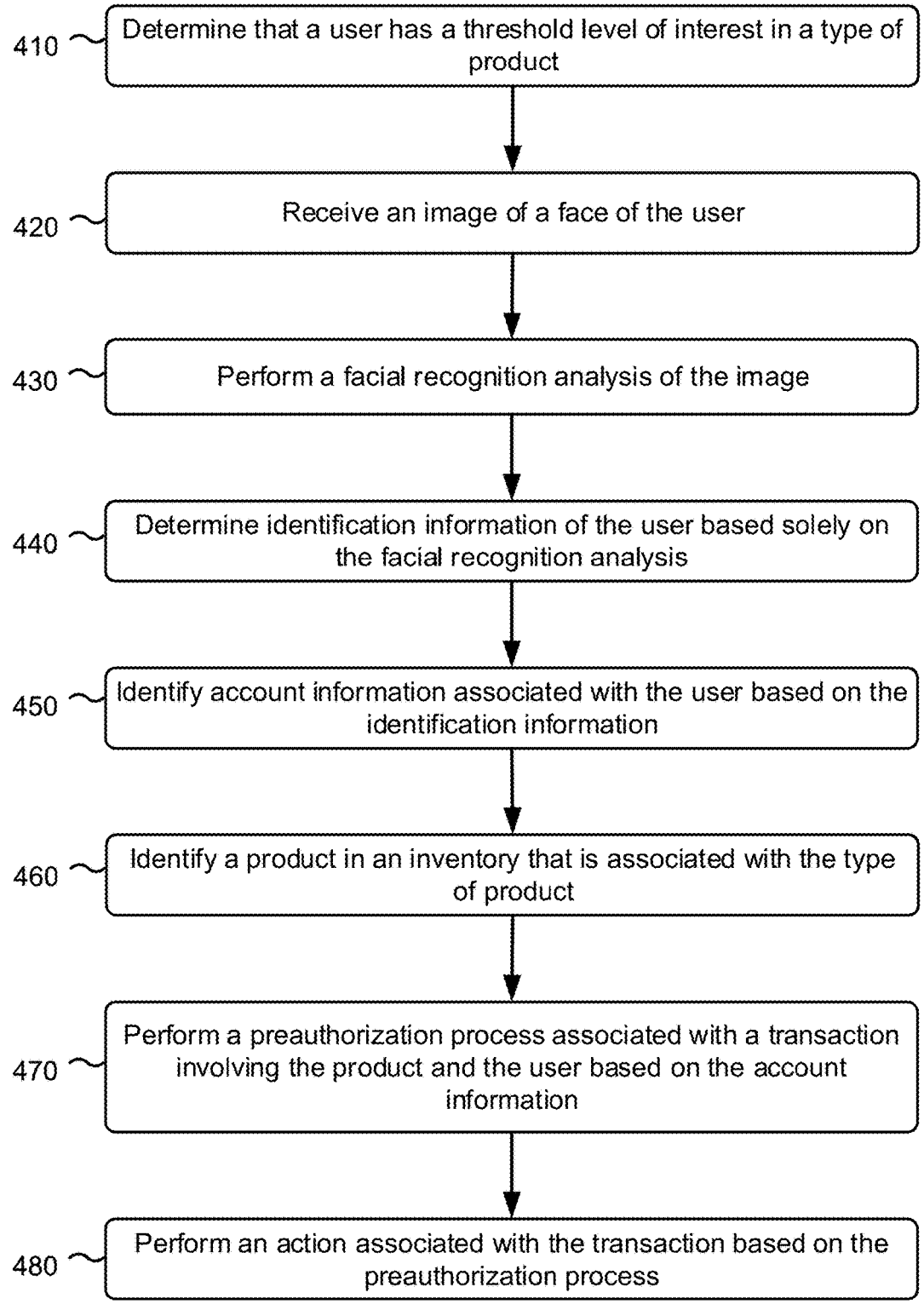
FIGS. 4-6 are flow charts of example processes associated with a product analysis platform to perform a facial recognition analysis to provide information associated with a product to a user.

FIG. 4 is a flow chart of an example process 400 associated with a product analysis platform to perform a facial recognition analysis to provide information associated with a product to a user. In some implementations, one or more process blocks of FIG. 4 may be performed by a product analysis platform (e.g., product analysis platform 210). In some implementations, one or more process blocks of FIG. 4 may be performed by another device or a group of devices separate from or including a product analysis platform (e.g., product analysis platform 210), such as a computing resource (e.g., computing resource 215), a user device (e.g., user device 230), and external information platforms (e.g., external information platforms 240).

As shown in FIG. 4, process 400 may include determining that a user has a threshold level of interest in a type of product (block 410). For example, the product analysis platform (e.g., using computing resource 215, processor 320, memory 330, storage component 340, input component 350, communication interface 370, and/or the like) may determine that a user has a threshold level of interest in a type of product, as described above.

As further shown in FIG. 4, process 400 may include receiving an image of a face of the user (block 420). For example, the product analysis platform (e.g., using computing resource 215, processor 320, memory 330, storage component 340, input component 350, communication interface 370, and/or the like) may receive an image of a face of the user, as described above.

As further shown in FIG. 4, process 400 may include performing a facial recognition analysis of the image (block 430). For example, the product analysis platform (e.g., using computing resource 215, processor 320, memory 330, storage component 340, and/or the like) may perform a facial recognition analysis of the image, as described above.

As further shown in FIG. 4, process 400 may include determining identification information of the user based solely on the facial recognition analysis (block 440). For example, the product analysis platform (e.g., using computing resource 215, processor 320, memory 330, storage component 340, and/or the like) may determine identification information of the user based solely on the facial recognition analysis, as described above.

As further shown in FIG. 4, process 400 may include identifying account information associated with the user based on the identification information (block 450). For example, the product analysis platform (e.g., using computing resource 215, processor 320, memory 330, storage component 340, and/or the like) may identify account information associated with the user based on the identification information, as described above.

As further shown in FIG. 4, process 400 may include identifying a product in an inventory that is associated with the type of product (block 460). For example, the product analysis platform (e.g., using computing resource 215, processor 320, memory 330, storage component 340, and/or the like) may identify a product in an inventory that is associated with the type of product, as described above.

As further shown in FIG. 4, process 400 may include performing a preauthorization process associated with a transaction involving the product and the user based on the account information (block 470). For example, the product analysis platform (e.g., using computing resource 215, processor 320, memory 330, storage component 340, communication interface 370, and/or the like) may perform a preauthorization process associated with a transaction involving the product and the user based on the account information, as described above.

As further shown in FIG. 4, process 400 may include performing an action associated with the transaction based on the preauthorization process (block 480). For example, the product analysis platform (e.g., using computing resource 215, processor 320, memory 330, storage component 340, input component 350, output component 360, communication interface 370, and/or the like) may perform an action associated with the transaction based on the preauthorization process, as described above.

Process 400 may include additional aspects, such as any single aspect or any combination of aspects described below and/or in connection with one or more other processes described elsewhere herein.

In some implementations, the product analysis platform may analyze a profile associated with the user, where the profile includes at least one of a purchase history that identifies one or more purchases associated with the type of product, or a rental history that identifies one or more rentals associated with the type of product. In some implementations, the user may be determined to have the threshold level of interest in the type of product based on the at least one of the purchase history or the rental history.

In some implementations, the user may be determined to have the threshold level of interest in the type of product based on a characteristic of a user device from which the image was obtained. In some implementations, the facial recognition analysis may use a data structure that includes identification data associated with image identifications of a plurality of individuals, where the user is one of the plurality of individuals.

In some implementations, the product analysis platform may identify, from the identification information, a location associated with the user, and may identify the product in the inventory based on the location associated with the user and a location associated with the product, where the location associated with the product is within a threshold distance of the location associated with the user.

In some implementations, when performing the action associated with the transaction, the product analysis platform may determine, from the preauthorization process, that the user is preauthorized to engage in the transaction involving the product, and may provide, for display to the user, information associated with the transaction and information associated with the product.

In some implementations, when performing the preauthorization process, the product analysis platform may determine, based on account information associated with the user, whether the user is eligible to engage in the transaction, and may determine one or more parameters associated with the transaction, where performing the action includes providing, for display, the one or more parameters associated with the transaction and information associated with the product.

Although FIG. 4 shows example blocks of process 400, in some implementations process 400 may include additional blocks, fewer blocks, different blocks, or differently arranged blocks than those depicted in FIG. 4. Additionally, or alternatively, two or more of the blocks of process 400 may be performed in parallel.

Figure 5:
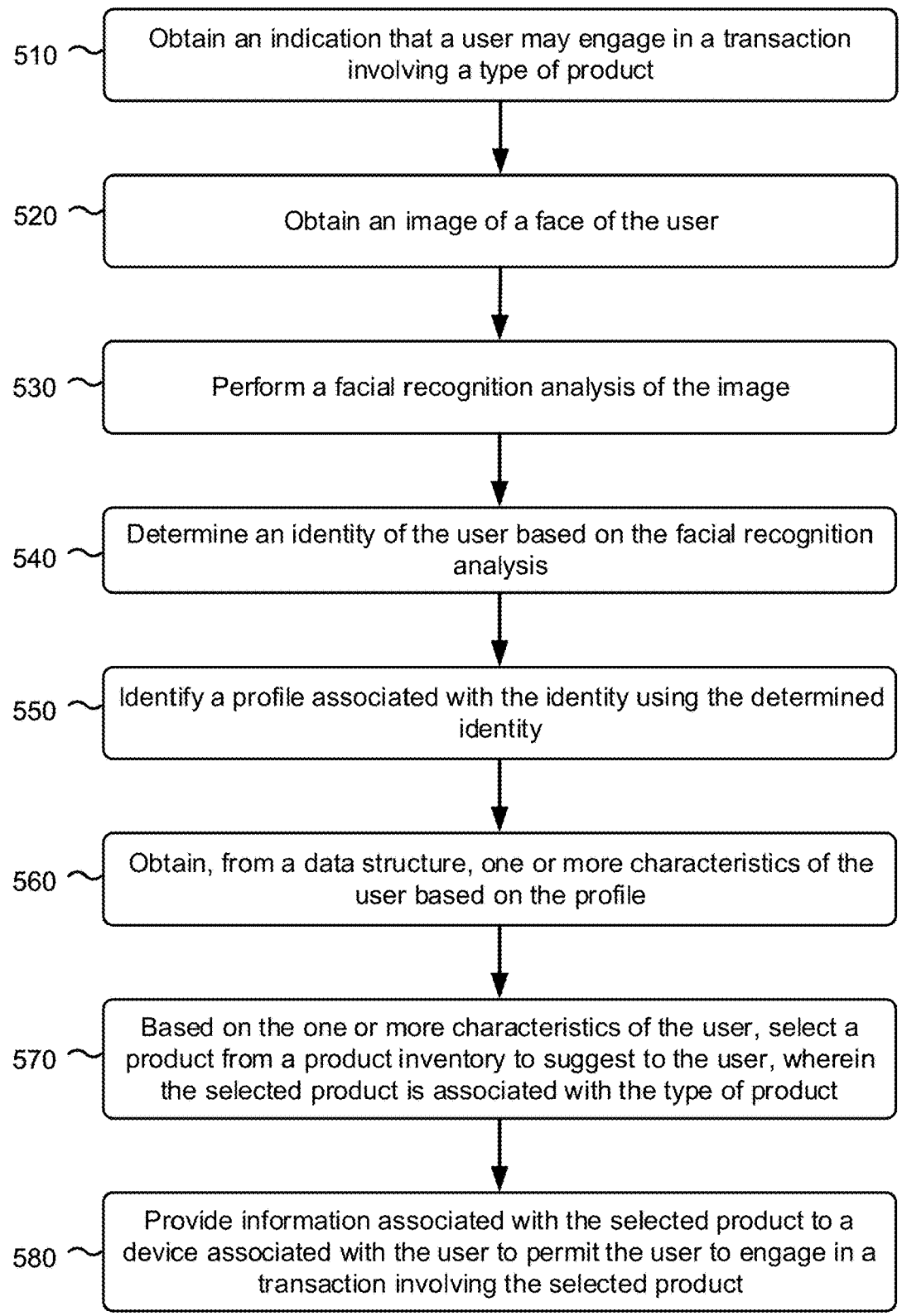

FIG. 5 is a flow chart of an example process 500 associated with a product analysis platform to perform a facial recognition analysis to provide information associated with a product to a user. In some implementations, one or more process blocks of FIG. 5 may be performed by a product analysis platform (e.g., product analysis platform 210). In some implementations, one or more process blocks of FIG. 5 may be performed by another device or a group of devices separate from or including a product analysis platform (e.g., product analysis platform 210), such as a computing resource (e.g., computing resource 215), a user device (e.g., user device 230), and external information platforms (e.g., external information platforms 240).

As shown in FIG. 5, process 500 may include obtaining an indication that a user may engage in a transaction involving a type of product (block 510). For example, the product analysis platform (e.g., using computing resource 215, processor 320, memory 330, storage component 340, input component 350, communication interface 370, and/or the like) may obtain an indication that a user may engage in a transaction involving a type of product, as described above.

As shown in FIG. 5, process 500 may include obtaining an image of a face of the user (block 520). For example, the product analysis platform (e.g., using computing resource 215, processor 320, memory 330, storage component 340, input component 350, communication interface 370, and/or the like) may obtain an image of a face of the user, as described above.

As shown in FIG. 5, process 500 may include performing a facial recognition analysis of the image (block 530). For example, the product analysis platform (e.g., using computing resource 215, processor 320, memory 330, storage component 340, input component 350, communication interface 370, and/or the like) may perform a facial recognition analysis of the image, as described above.

As shown in FIG. 5, process 500 may include determining an identity of the user based on the facial recognition analysis (block 540). For example, the product analysis platform (e.g., using computing resource 215, processor 320, memory 330, storage component 340, and/or the like) may determine an identity of the user based on the facial recognition analysis, as described above.

As shown in FIG. 5, process 500 may include identifying a profile associated with the identity using solely the determined identity (block 550). For example, the product analysis platform (e.g., using computing resource 215, processor 320, memory 330, storage component 340, and/or the like) may identify a profile associated with the identity using solely the determined identity, as described above.

As shown in FIG. 5, process 500 may include obtaining, from a data structure, one or more characteristics of the user based on the profile (block 560). For example, the product analysis platform (e.g., using computing resource 215, processor 320, memory 330, storage component 340, and/or the like) may obtain, from a data structure, one or more characteristics of the user based on the profile, as described above.

As shown in FIG. 5, process 500 may include selecting, based on the one or more characteristics of the user, a product from a product inventory to suggest to the user, wherein the selected product is associated with the type of product (block 570). For example, the product analysis platform (e.g., using computing resource 215, processor 320, memory 330, storage component 340, and/or the like) may select, based on the one or more characteristics of the user, a product from a product inventory to suggest to the user, as described above. In some implementations, the selected product may be associated with the type of product.

As shown in FIG. 5, process 500 may include providing information associated with the selected product to a device associated with the user to permit the user to engage in a transaction involving the selected product (block 580). For example, the product analysis platform (e.g., using computing resource 215, processor 320, memory 330, storage component 340, output component 360, communication interface 370, and/or the like) may provide information associated with the selected product to a device associated with the user to permit the user to engage in a transaction involving the selected product, as described above.

Process 500 may include additional aspects, such as any single aspect or any combination of aspects described below and/or in connection with one or more other processes described elsewhere herein.

In some implementations, the product analysis platform may, based on obtaining the indication, request that the user provide the image, where the user, by providing the image, provides an authorization to receive the information associated with the selected product. In some implementations, the one or more characteristics of the user may include at least one of a location associated with the user, a physical trait of the user, a number of authorized users associated with the user, a determined tendency to engage in a transaction associated with the product, a determined tendency to rent the product, or a score indicating that the user is eligible to purchase the product.

In some implementations, the product analysis platform may determine one or more parameters associated with the transaction based on the one or more characteristics of the user and a value associated with the selected product, may indicate the one or more parameters of the transaction to the user, and may authorize the transaction for the selected product based on receiving an acceptance of the one or more parameters. In some implementations, the product analysis platform may determine one or more parameters for a potential transaction involving the selected product, where the potential transaction may permit the user to purchase the selected product according to the one or more parameters.

In some implementations, the product analysis platform may identify one or more characteristics of the selected product, where the one or more processors are to select the selected product based on the one or more characteristics of the selected product corresponding to the one or more characteristics of the user. In some implementations, the one or more characteristics of the product may include at least one of a location associated with the selected product, a dimension of the selected product, a specification of the selected product, a feature of the selected product, a value associated with the selected product, or a style of the selected product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
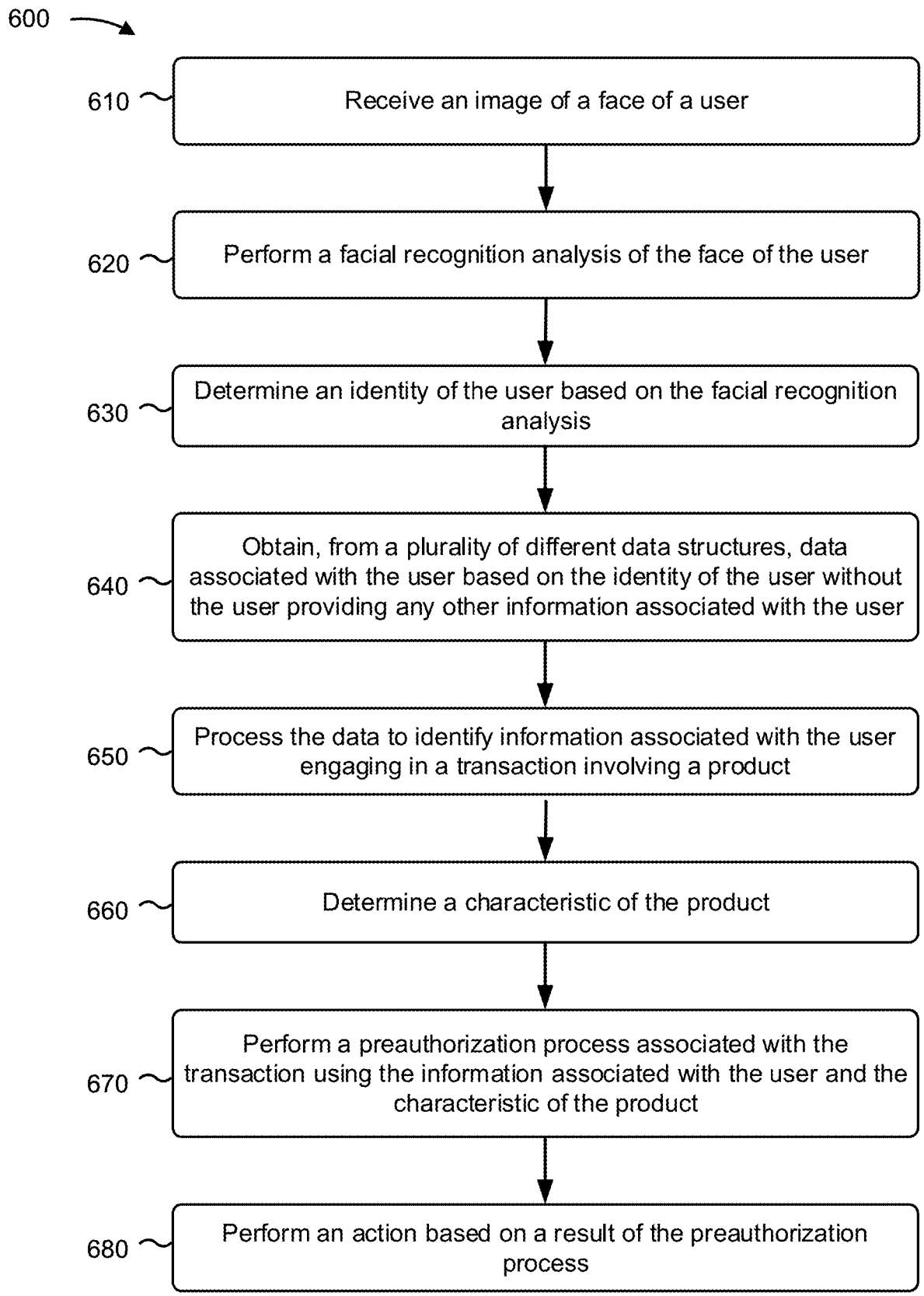

FIG. 6 is a flow chart of an example process 600 associated with a product analysis platform to perform a facial recognition analysis to provide information associated with a product to a user. In some implementations, one or more process blocks of FIG. 6 may be performed by a product analysis platform (e.g., product analysis platform 210). In some implementations, one or more process blocks of FIG. 6 may be performed by another device or a group of devices separate from or including a product analysis platform (e.g., product analysis platform 210), such as a computing resource (e.g., computing resource 215), a user device (e.g., user device 230), and external information platforms (e.g., external information platforms 240).

As shown in FIG. 6, process 600 may include receiving an image of a face of a user (block 610). For example, the product analysis platform (e.g., using computing resource 215, processor 320, memory 330, storage component 340, input component 350, communication interface 370, and/or the like) may receive an image of a face of a user, as described above.

As further shown in FIG. 6, process 600 may include performing a facial recognition analysis of the face of the user (block 620). For example, the product analysis platform (e.g., using computing resource 215, processor 320, memory 330, storage component 340, and/or the like) may perform a facial recognition analysis of the face of the user, as described above.

As further shown in FIG. 6, process 600 may include determining an identity of the user based on the facial recognition analysis (block 630). For example, the product analysis platform (e.g., using computing resource 215, processor 320, memory 330, storage component 340, and/or the like) may determine an identity of the user based on the facial recognition analysis, as described above.

As further shown in FIG. 6, process 600 may include obtaining, from a plurality of different data structures, data associated with the user based on the identity of the user without the user providing any other information associated with the user (block 640). For example, the product analysis platform (e.g., using computing resource 215, processor 320, memory 330, storage component 340, and/or the like) may obtain, from a plurality of different data structures, data associated with the user based on the identity of the user without the user providing any other information associated with the user, as described above.

As further shown in FIG. 6, process 600 may include processing the data to identify information associated with the user engaging in a transaction involving a product (block 650). For example, the product analysis platform (e.g., using computing resource 215, processor 320, memory 330, storage component 340, and/or the like) may process the data to identify information associated with the user engaging in a transaction involving a product, as described above.

As further shown in FIG. 6, process 600 may include determining a characteristic of the product (block 660). For example, the product analysis platform (e.g., using computing resource 215, processor 320, memory 330, storage component 340, and/or the like) may determine a characteristic of the product, as described above.

As further shown in FIG. 6, process 600 may include performing a preauthorization process associated with the transaction using the information associated with the user and the characteristic of the product (block 670). For example, the product analysis platform (e.g., using computing resource 215, processor 320, memory 330, storage component 340, communication interface 370, and/or the like) may perform a preauthorization process associated with the transaction using the information associated with the user and the characteristic of the product, as described above.

As further shown in FIG. 6, process 600 may include performing an action based on a result of the preauthorization process (block 680). For example, the product analysis platform (e.g., using computing resource 215, processor 320, memory 330, storage component 340, input component 350, output component 360, communication interface 370, and/or the like) may perform an action based on a result of the preauthorization process, as described above.

Process 600 may include additional aspects, such as any single aspect or any combination of aspects described below and/or in connection with one or more other processes described elsewhere herein.

In some implementations, the product may be owned by the user and the transaction may involve renegotiating a previous transaction involving the product. In some implementations, the characteristic of the product may include a value associated with the product, and when determining the characteristic of the product, the product analysis platform may analyze a purchase history of the user based on determining a likelihood that the user is interested in renegotiating the previous transaction involving the product, and may identify the product in the purchase history to permit the characteristic of the product to be determined.

In some implementations, the product analysis platform may determine a plurality of characteristics of the user based on the data, may analyze an inventory of products based on a first characteristic of the plurality of characteristics of the user, and may select the product from the inventory of products based on a second characteristic of the plurality of characteristics. In some implementations, when performing the action, the product analysis platform may provide information associated with the product to the user when the preauthorization process indicates that the user is qualified to engage in the transaction for the product.

In some implementations, when performing the action, the product analysis platform may determine one or more parameters for the transaction based on the preauthorization process, and may provide the one or more parameters to the user to permit the user to engage in the transaction by accepting the one or more parameters. In some implementations, the facial recognition analysis may use a data structure that includes identification data associated with image identifications of a plurality of individuals, where the user is one of the plurality of individuals.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, that a user has a threshold level of interest in a type of product;
   receiving, by the device, an image of a face of the user;
   performing, by the device and using one or more artificial intelligence techniques, a facial recognition analysis of the image;
   determining, by the device, identification information of the user based on the facial recognition analysis;
   identifying, by the device, account information associated with the user based on the identification information;
   identifying, by the device, a product in an inventory that is associated with the type of product;
   performing, by the device, a preauthorization process associated with a transaction involving the product and the user based on the account information, the preauthorization process being performed after determining the identification information from the user based on the facial recognition analysis and without receiving input from the user after performing the facial recognition analysis, and wherein performing the preauthorization process includes:

providing, by the device, at least one preauthorization parameter as input to a preauthorization model, the preauthorization model having been trained, using historical data associated with preauthorizing at least one of the user or one or more other users, to use the at least one preauthorization parameter to determine whether transactions are preauthorized, and the at least one preauthorization parameter being associated with the account information and including at least one of:
one or more characteristics of the transaction,
one or more characteristics of the product, or
one or more user characteristics of the user;

determining, by the device and from the preauthorization process, that the user is preauthorized to engage in the transaction; and providing, by the device and to a user device for display, information associated with the transaction and information associated with the product, the information associated with the transaction specifying that the user is preauthorized to purchase the product, and the information associated with the transaction enabling the user to authorize purchase of the product.

2. The method of claim 1, further comprising:
analyzing a profile associated with the user,
wherein the profile includes at least one of:
a purchase history that identifies one or more purchases associated with the type of product, or
a rental history that identifies one or more rentals associated with the type of product, and
wherein the user is determined to have the threshold level of interest in the type of product based on the at least one of the purchase history or the rental history.

3. The method of claim 1, wherein the user is determined to have the threshold level of interest in the type of product based on a characteristic of another device from which the image was obtained.

4. The method of claim 1, wherein the facial recognition analysis uses a data structure that includes identification data associated with image identifications of a plurality of individuals, and
wherein the user is one of the plurality of individuals.

5. The method of claim 1, further comprising:
identifying, from the identification information, a location associated with the user; and
identifying the product in the inventory based on the location associated with the user and a location associated with the product,
wherein the location associated with the product is within a threshold distance of the location associated with the user.

6. The method of claim 1, wherein performing the preauthorization process comprises:

determining, based on account information associated with the user, whether the user is eligible to engage in the transaction; and determining one or more parameters associated with the transaction; and wherein providing the information associated with the transaction includes providing the one or more parameters associated with the transaction and information associated with the product.

7. The method of claim 1, wherein identifying the product comprises:
identifying the product based on one or more characteristics of the user, the one or more characteristics comprising at least one of:
a location associated with the user,
a physical trait of the user,
a quantity of authorized users associated with the user,
a determined tendency to engage in the transaction associated with the product,
a determined tendency to rent the product, or
a score indicating that the user is eligible to purchase the product.

8. A device, comprising:
one or more memories; and
one or more processors, communicatively coupled to the one or more memories, configured to:
obtain an indication that a user may engage in a transaction involving a type of product;
determine, based on the indication, that the user has a threshold level of interest in the type of product;
obtain an image of a face of the user;
perform, using one or more artificial intelligence techniques, a facial recognition analysis of the image;
determine an identity of the user based on the facial recognition analysis;
identify a profile associated with the identity using the determined identity;
obtain, from a data structure, one or more characteristics of the user based on the profile;
identify, based on the one or more characteristics of the user, a product in an inventory, the product being associated with the type of product;
perform a preauthorization process associated with the transaction and the user based on the one or more characteristics of the user,
the preauthorization process being performed after determining the identity of the user based on the facial recognition analysis and without receiving input from the user after performing the facial recognition analysis, and
wherein the preauthorization process includes:
providing at least one preauthorization parameter as input to a preauthorization model,
the preauthorization model having been trained, using historical data associated with preauthorizing at least one of the user or one or more other users, to use the at least one preauthorization parameter to determine whether transactions are preauthorized, and
the at least one preauthorization parameter being associated with at least one of:
one or more characteristics of the transaction,
one or more characteristics of the product, or
the one or more characteristics of the user;
determine, from the preauthorization process, that the user is preauthorized to engage in the transaction; and provide information associated with the product to a device associated with the user, the information:
permitting the user to engage in the transaction, and
specifying that the user is preauthorized to purchase the product.

9. The device of claim 8, wherein the one or more processors are further configured to:
based on obtaining the indication, request that the user provide the image,
wherein the user, by providing the image, provides an authorization to receive the information associated with the product.

10. The device of claim 8, wherein the one or more characteristics of the user comprises at least one of:
a location associated with the user,
a physical trait of the user,
a number of authorized users associated with the user,
a determined tendency to engage in the transaction,
a determined tendency to rent the product, or
a score indicating that the user is eligible to purchase the product.

11. The device of claim 8, wherein the one or more processors are further configured to:
determine one or more parameters associated with the transaction based on the one or more characteristics of the user and a value associated with the product;
indicate the one or more parameters of the transaction to the user; and
authorize the transaction for the product based on receiving an acceptance of the one or more parameters.

12. The device of claim 8, wherein the one or more processors are further configured to:
identify one or more characteristics of the product,
wherein the one or more processors are to identify the product based on the one or more characteristics of the product corresponding to the one or more characteristics of the user.

13. The device of claim 12, wherein the one or more characteristics of the product comprise at least one of:
a location associated with the product,
a dimension of the product,
a specification of the product,
a feature of the product,
a value associated with the product, or
a style of the product.

14. The device of claim 8, wherein the indication that the user may engage in the transaction is based on a characteristic of another device from which the image was obtained.

15. A non-transitory computer-readable medium storing instructions, the instructions comprising:
one or more instructions that, when executed by one or more processors, cause the one or more processors to:
receive an image of a face of a user;
perform, using one or more artificial intelligence techniques, a facial recognition analysis of the face of the user;
determine an identity of the user based on the facial recognition analysis;
obtain, from a plurality of different data structures, data associated with the user based on the identity of the user without the user providing any other information associated with the user;
determine, based on the data, that the user has a threshold level of interest in a type of product;
identify a product, from an inventory of products, that is associated with the type of product;
determine a characteristic of the product;
perform a preauthorization process associated with a transaction involving the product using the data associated with the user and the characteristic of the product,
the preauthorization process being performed after determining the identity of the user based on the facial recognition analysis and without receiving input from the user after performing the facial recognition analysis, and
wherein the preauthorization process includes:
providing at least one preauthorization parameter as input to a preauthorization model,
the preauthorization model having been trained, using historical data associated with preauthorizing at least one of the user or one or more other users, to use the at least one preauthorization parameter to determine whether transactions are preauthorized, and
the at least one preauthorization parameter being associated with one or more of:
one or more characteristics of the transaction,
one or more characteristics of the product, or
the one or more characteristics of the user;
determine, from the preauthorization process, that the user is preauthorized to engage in the transaction; and
perform an action based on a result of the preauthorization process.

16. The non-transitory computer-readable medium of claim 15, wherein the product is owned by the user and the transaction involves renegotiating a previous transaction involving the product.

17. The non-transitory computer-readable medium of claim 16, wherein the characteristic of the product comprises a value associated with the product, and the one or more instructions that cause the one or more processors to determine the characteristic of the product, cause the one or more processors to:
analyze a purchase history of the user based on determining a likelihood that the user is interested in renegotiating the previous transaction involving the product; and
identify the product in the purchase history to permit the characteristic of the product to be determined.

18. The non-transitory computer-readable medium of claim 15, wherein the one or more instructions, when executed, further cause the one or more processors to:
determine a plurality of characteristics of the user based on the data;
analyze the inventory of products based on a first characteristic of the plurality of characteristics of the user; and
select the product from the inventory of products based on a second characteristic of the plurality of characteristics,
wherein the one or more instructions that cause the one or more processors to perform the action cause the one or more processors to:
provide information associated with the product to the user when the preauthorization process indicates that the user is preauthorized to engage in the transaction.

19. The non-transitory computer-readable medium of claim 15, wherein the one or more instructions, that cause the one or more processors to perform the action, cause the one or more processors to:
determine one or more parameters for the transaction based on the preauthorization process; and provide the one or more parameters to the user to permit the user to engage in the transaction by accepting the one or more parameters.

20. The non-transitory computer-readable medium of claim 15, wherein the facial recognition analysis uses a data structure that includes identification data associated with image identifications of a plurality of individuals, wherein the user is one of the plurality of individuals.

\* \* \* \* \*